United States Patent
Takahashi et al.

(10) Patent No.: US 9,979,271 B2
(45) Date of Patent: May 22, 2018

(54) POWER CONVERTER WITH ZERO-VOLTAGE SWITCHING CONTROL

(71) Applicants: DENSO CORPORATION, Kariya, Aichi-pref. (JP); NATIONAL UNIVERSITY CORP. OITA UNIVERSITY, Oita, Oita-pref. (JP)

(72) Inventors: Masaya Takahashi, Kariya (JP); Nobuhisa Yamaguchi, Kariya (JP); Kimihiro Nishijima, Oita (JP)

(73) Assignees: DENSO CORPORATION, Kariya (JP); NATIONAL UNIVERSITY CORPORATION OITA UNIVERTY, Oita (JP)

( * ) Notice: Subject to any disclaimer, the term of this patent is extended or adjusted under 35 U.S.C. 154(b) by 0 days. days.

(21) Appl. No.: 15/434,453

(22) Filed: Feb. 16, 2017

(65) Prior Publication Data
US 2017/0237332 A1 Aug. 17, 2017

(30) Foreign Application Priority Data
Feb. 17, 2016 (JP) .................. 2016-027950

(51) Int. Cl.
*H02M 1/08* (2006.01)
*H02M 3/158* (2006.01)
*H02M 1/00* (2006.01)

(52) U.S. Cl.
CPC .......... *H02M 1/083* (2013.01); *H02M 3/158* (2013.01); *H02M 3/1588* (2013.01); *H02M 2001/0058* (2013.01); *Y02B 70/1466* (2013.01); *Y02B 70/1491* (2013.01)

(58) Field of Classification Search
CPC ............................................. H02M 2001/0058
See application file for complete search history.

(56) References Cited

U.S. PATENT DOCUMENTS 4,860,145 A * 8/1989 Klingbiel ............... H02H 7/055
323/257
5,410,467 A * 4/1995 Smith ................... H02M 3/158
363/131

(Continued)

FOREIGN PATENT DOCUMENTS

JP  2009-112182 A  5/2009
JP  2011-114931 A  6/2011

(Continued)

*Primary Examiner* — Yusef A Ahmed
(74) *Attorney, Agent, or Firm* — Oliff PLC

(57) ABSTRACT

In a power converter, switch-off of the synchronous rectification switch while the auxiliary switch is on causes the first capacitance of the main switch and the second capacitance of the synchronous rectification switch to resonate with the inductance of the second magnetic component. A parameter obtainer detects a voltage across a selected one of the main switch and the synchronous rectification switch, and obtains a parameter indicative of a corresponding one of rising and falling waveforms of the voltage across the selected switch while the selected switch is switched. A controller controls a switching control signal for the auxiliary switch to adjust switch-on timing of the auxiliary switch as a function of the parameter obtained by the parameter obtainer.

14 Claims, 20 Drawing Sheets

(56) References Cited

U.S. PATENT DOCUMENTS

| | | | | |
|---|---|---|---|---|
| 5,477,131 A * | 12/1995 | Gegner | ................ | H02M 3/158 323/222 |
| 5,485,076 A * | 1/1996 | Schoenwald | ......... | H02M 3/337 323/224 |
| 5,552,695 A * | 9/1996 | Schwartz | ................ | G05F 1/40 323/271 |
| 6,188,209 B1 * | 2/2001 | Poon | .................... | H02M 3/158 323/224 |
| 7,006,362 B2 * | 2/2006 | Mizoguchi | ............ | H02M 3/158 323/271 |
| 7,498,783 B2 * | 3/2009 | Johnson | ................ | H02M 1/15 323/272 |
| 7,915,874 B1 * | 3/2011 | Cuk | .................... | H02M 3/158 323/224 |
| 8,669,744 B1 | 3/2014 | Vinciarelli | | |
| 2004/0066178 A1 * | 4/2004 | Mizoguchi | ............ | H02M 3/158 323/205 |
| 2005/0116763 A1 * | 6/2005 | Van Der Broeck | .. | G09G 3/2965 327/423 |
| 2007/0230228 A1 * | 10/2007 | Mao | .................... | H02M 3/156 363/89 |
| 2011/0260706 A1 * | 10/2011 | Nishijima | ............ | H02M 3/157 323/311 |

FOREIGN PATENT DOCUMENTS

| | | |
|---|---|---|
| JP | 2012-060822 A | 3/2012 |
| JP | 2017-147851 A | 8/2017 |
| JP | 2017-147852 A | 8/2017 |

\* cited by examiner

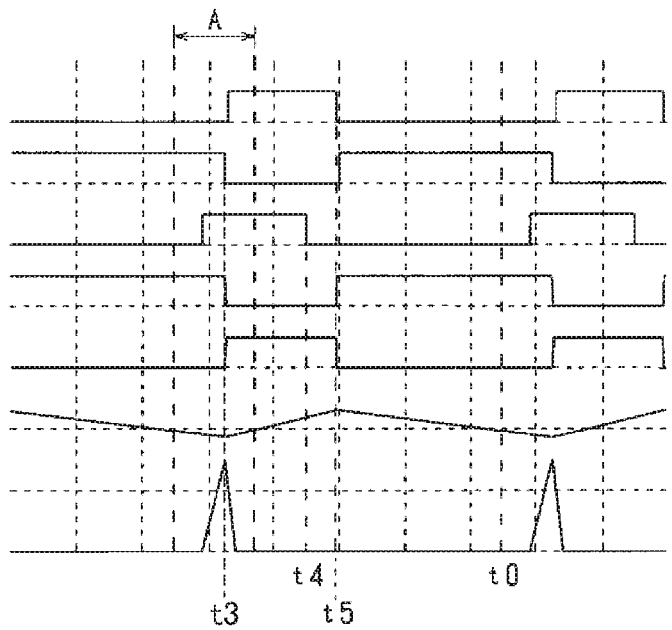
FIG. 2A GATE VOLTAGE Vgs1
FIG. 2B GATE VOLTAGE Vgs2
FIG. 2C GATE VOLTAGE Vgs3
FIG. 2D DRAIN-SOURCE VOLTAGE Vds1
FIG. 2E DRAIN-SOURCE VOLTAGE Vds2
FIG. 2F INDUCTOR CURRENT IL1
FIG. 2G AUXILIRY CURRENT IL2
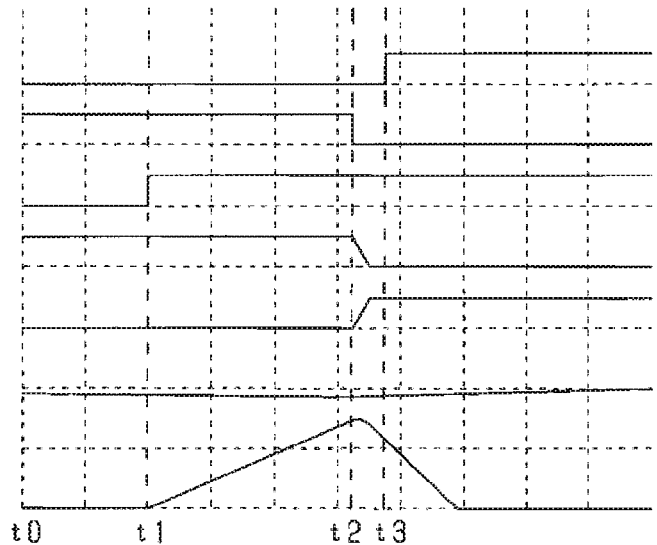
FIG. 3A GATE VOLTAGE Vgs1
FIG. 3B GATE VOLTAGE Vgs2
FIG. 3C GATE VOLTAGE Vgs3
FIG. 3D DRAIN-SOURCE VOLTAGE Vds1
FIG. 3E DRAIN-SOURCE VOLTAGE Vds2
FIG. 3F INDUCTOR CURRENT IL1
FIG. 3G AUXILIRY CURRENT IL2

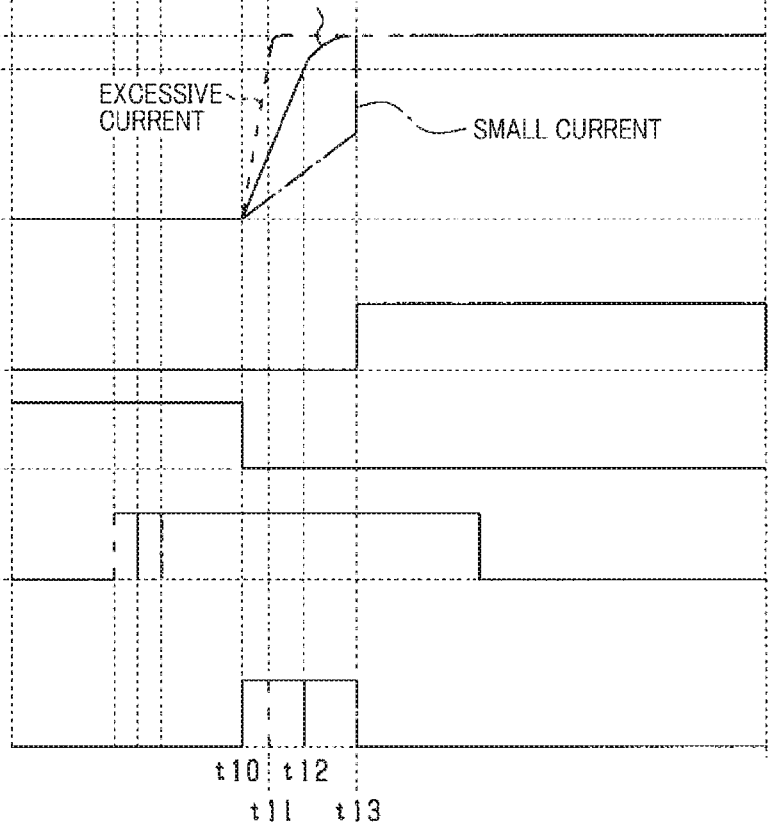
FIG.11A AUXILIRY CURRENT IL2
FIG.11B DRAIN-SOURCE VOLTAGE Vds2
FIG.11C GATE VOLTAGE Vgs1
FIG.11D GATE VOLTAGE Vgs2
FIG.11E GATE VOLTAGE Vgs3
FIG.11F TRANSITION TIME Ta

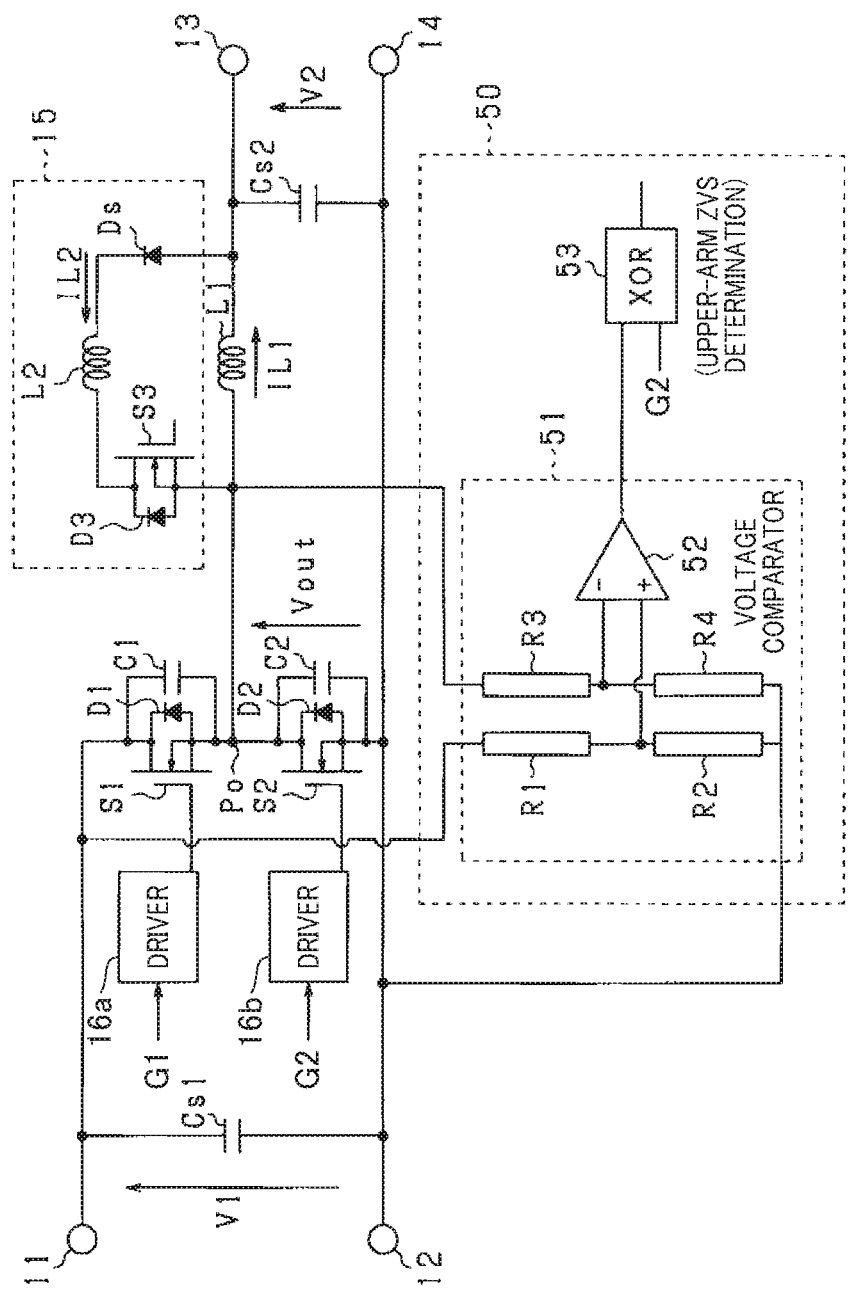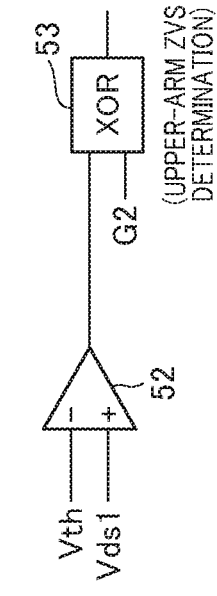

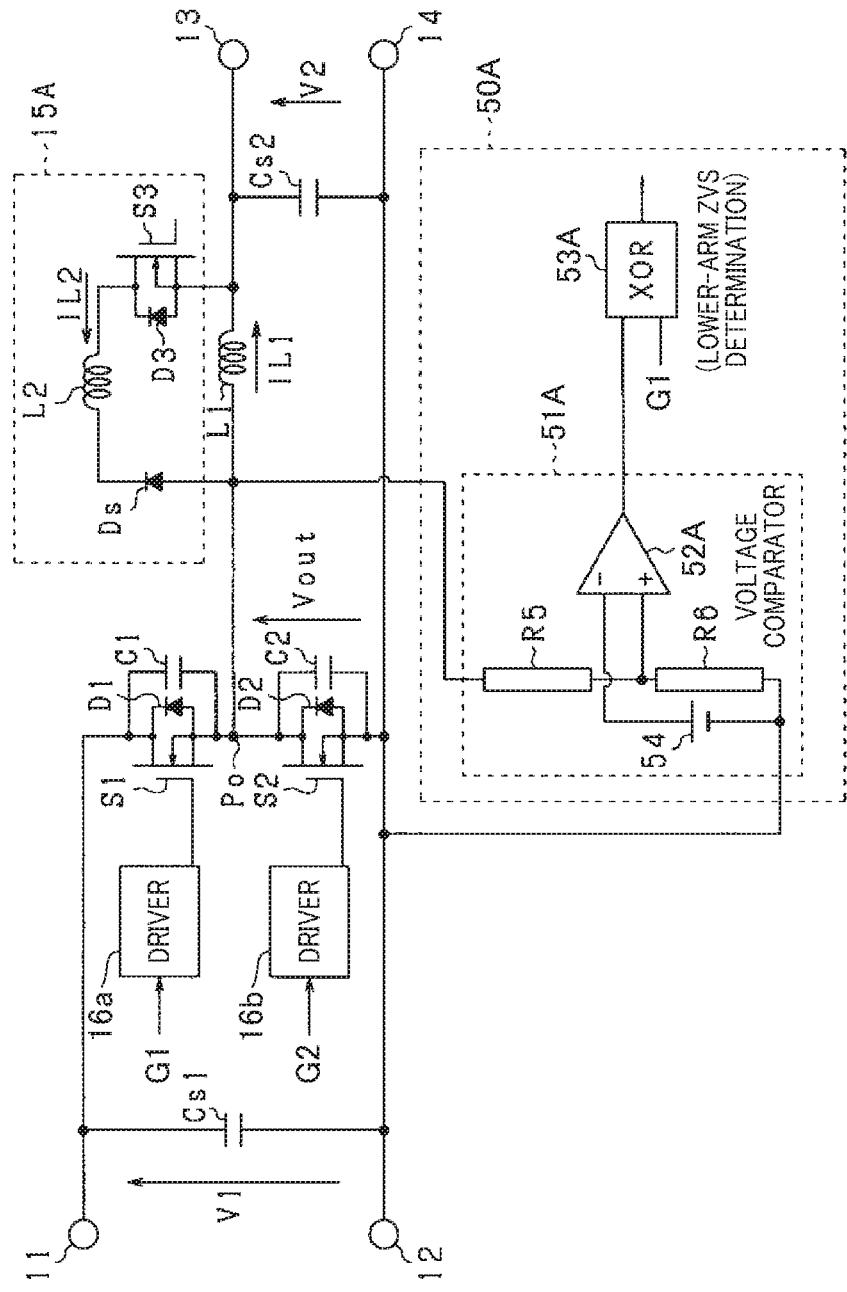
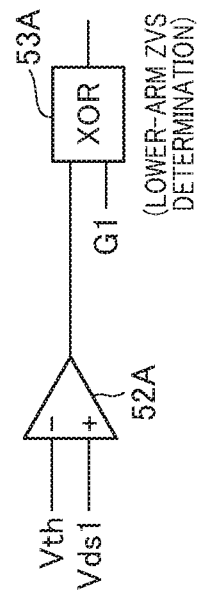
FIG. 17A
FIG. 17B

INDUCTOR CURRENT
IL1a, IL1b

AUXILIARY CURRENT
IL2a, IL2b

DRAIN-SOURCE VOLTAGE
Vds2a, Vds2b

NO ZVS CONTROL

EXECUTION OF ZVS CONTROL

POWER CONVERTER WITH ZERO-VOLTAGE SWITCHING CONTROL

CROSS REFERENCE TO RELATED APPLICATIONS

This application is based on and claims the benefit of priority from Japanese Patent Application 2016-027950 filed on Feb. 17, 2016, the disclosure of which is incorporated in its entirety herein by reference.

TECHNICAL FIELD

The present disclosure relates to power converters capable of performing zero-voltage switching control.

BACKGROUND

One type of power converters is designed to perform zero-voltage switching control, referred to simply as ZVS control. The ZVS control is to perform switching of a switch or a switching element while a voltage across the switching element is zero. Power converters, which are capable of performing the ZVS control, aim to reduce switching loss of their switching elements to have higher efficiency accordingly. An example of these power converters is disclosed as a DC-DC converter in Japanese Patent Application No. 2004-129393, which is referred to as patent document 1.

The DC-DC converter disclosed in patent document 1 includes first and second main switches connected in series between input terminals of the DC-DC converter, and a smoothing inductor connected between an output terminal of the DC-DC converter and the connection point between the first and second main switches. The DC-DC converter also includes an auxiliary resonance circuit, which is comprised of a resonance inductor and an auxiliary switch, connected between the output terminal and the connection point between the first and second main switches. The DC-DC converter further includes resonance capacitors connected in parallel to the respective first and second main switches.

The DC-DC converter measures an auxiliary current flowing through the auxiliary resonance circuit using a current sensor.

When the measured auxiliary current satisfies a predetermined ZVS condition, the DC-DC converter turns off the second main switch, and turns on the auxiliary switch within the period from turn-off of the second main switch to turn-on of the first main switch. This results in electrical energy being supplied from the output terminal to the resonance inductor. This causes the resonance inductor and the resonance capacitors to resonate with each other.

After lapse of predetermined dead time since the turn-off of the second main switch, the DC-DC converter turns on the first main switch while the voltage across the first main switch is kept zero. This therefore results in reliable ZVS control of the first main switch.

Note that the predetermined ZVS condition is that the measured auxiliary current is equal to or higher than a value determined based on the input and output voltages, the capacitances of the respective resonance capacitors, and the inductance of the resonance inductor.

SUMMARY

The DC-DC converter disclosed in patent document 1 performs the ZVS control of the first main switch based on the auxiliary current, which flows through the auxiliary resonance circuit and is measured by the current sensor. The auxiliary current measured by the current sensor varies depending on the variations in ZVS parameters; the ZVS parameters include the input and output voltages, the measurement accuracy of the current sensor, the inductance of the resonance inductor, the capacitances of the respective resonance capacitors, and the temperature characteristics of the DC-DC converter. In other words, it is necessary to cause the auxiliary current whose level has a sufficient margin to flow through the auxiliary resonance circuit; the margin enables the ZVS control of the first main switch to be carried out even if the widest variations of the ZVS parameters are happened.

This may unfortunately result in higher loss of the DC-DC converter due to the margin of the auxiliary current as compared with the case where the DC-DC converter causes the auxiliary current with no margin to flow through the auxiliary resonance circuit.

In view the circumstances set forth above, a first aspect of the present disclosure seeks to provide power converters each capable of addressing the problem set forth above.

Specifically, a second aspect of the present disclosure aims to provide such power converters, each of which is capable of carrying out proper ZVS control with lower loss of the power converter.

A first exemplary aspect of the present disclosure is a power converter. The power converter includes a switching circuit including a main switch with a first capacitance, a synchronous rectification switch with a second capacitance, and a first magnetic component. The switching circuit is configured to convert an input voltage to a predetermined output voltage according to complementary switching of the main switch and the synchronous rectification switch. The power converter includes an auxiliary switching circuit comprising an auxiliary switch and a second magnetic component with an inductance. The auxiliary switching circuit is configured such that switch-off of the synchronous rectification switch while the auxiliary switch is on causes the first capacitance of the main switch and the second capacitance of the synchronous rectification switch to resonate with the inductance of the second magnetic component. The power converter includes a parameter obtainer configured to detect a voltage across a selected one of the main switch and the synchronous rectification switch. The parameter obtainer is configured to obtain a parameter indicative of a corresponding one of rising and falling waveforms of the voltage across the selected switch while the selected switch is switched. The power converter includes a controller configured to output a switching control signal to each of the main switch, the synchronous rectification switch, and the auxiliary switch to control switching of the corresponding one of the main switch, the synchronous rectification switch, and the auxiliary switch. The controller is configured to control, as a function of the parameter obtained by the parameter obtainer, the switching control signal for the auxiliary switch to adjust switch-on timing of the auxiliary switch.

The resonance generated based on turn-on of the auxiliary switch while one of the main switch and the synchronous rectification switch is off causes the voltage across the main switch to be zero. Switching on the main switch by the controller while the voltage across the main switch is zero enables the ZVS control of the main switch to be carried out.

Turn-off timing of one of the main switch and the synchronous rectification switch depends on an auxiliary current flowing through the auxiliary switching circuit while the resonance is generated by the auxiliary switching circuit.

The level of the auxiliary current varies depending on the variations in ZVS parameters; the ZVS parameters include the input and output voltages, the inductance of the second magnetic component, the first and second capacitances, and temperature characteristics of the power converter. That is, it could be necessary to cause the auxiliary current whose level has a margin to flow through the auxiliary switching circuit; the margin enables the auxiliary current to satisfy a predetermined condition that can perform ZVS control of the main switch even if the widest variations of the ZVS parameters occur.

This could unfortunately result in higher switching loss of each of the synchronous rectification switch and the auxiliary switch due to the margin of the auxiliary current. This therefore could result in higher loss of the entire circuit of the power converter.

In view of this need, the inventors of the present disclosure have focused on the fact that information about the auxiliary current appears in each of the rising waveform of the voltage across the synchronous rectification switch and the falling waveform of the voltage across the main switch after switch-off of one of the main switch and the synchronous rectification switch. The rising waveform of the voltage across the synchronous rectification switch is complementary to the falling waveform of the voltage across the main switch.

The longer the period for which the synchronous rectification switch and the auxiliary switch are on together, the larger magnetic energy stored in the second magnetic component is.

For example, the larger the magnetic energy stored in the second magnetic component is, the more rapidly the voltage across the second capacitor rises when the synchronous rectification switch is switched off so that the first and second capacitors and the second magnetic component resonate with each other. Specifically, the voltage across the synchronous rectification switch rises sharply, so that the voltage across the main switch falls sharply. For this reason, information about the auxiliary current appears in each of the rising waveform of the voltage across the synchronous rectification switch and the falling waveform of the voltage across the main switch after turn-off of the synchronous rectification switch. Each of the rising waveform of the voltage across the synchronous rectification switch and the falling waveform of the voltage across the main switch shows a transient phenomenon of the corresponding one of the voltage across the synchronous rectification switch and the falling waveform of the voltage across the main switch. In other words, each of the rising waveform of the voltage across the synchronous rectification switch and the falling waveform of the voltage across the main switch depends on variations of each of the ZVS parameters.

In view of these circumstances, the parameter obtainer detects the voltage across a selected one of the main switch and the synchronous rectification switch. The parameter obtainer obtains the parameter indicative of the corresponding one of the rising and falling waveforms of the voltage across the selected switch while the selected switch is switched. The controller controls, as a function of the parameter obtained by the parameter obtainer, the switching control signal for the auxiliary switch to adjust switch-on timing of the auxiliary switch.

Adjusting switch-on timing of the auxiliary switch based on the parameter indicative of the corresponding one of the rising and falling waveforms of the voltage across the selected switch enables the level of the auxiliary current to be optimized even if there are variations in the ZVS control parameters. This therefore enables proper ZVS control of the main switch to be carried out with lower loss of the power converter.

BRIEF DESCRIPTION OF THE DRAWINGS

Other aspects of the present disclosure will become apparent from the following description of embodiments with reference to the accompanying drawings in which:

FIGS. 2A to 2G are a joint timing chart schematically illustrating how predetermined parameters of the power converter change with time;

FIGS. 3A to 3G are each a timing chart which schematically illustrates an enlarged portion of the corresponding one of the timing charts of FIGS. 2A to 2G;

FIG. 11A is a timing chart schematically illustrating how an auxiliary current changes with time within a predetermined period before and after turn-off of the synchronous rectification switch;

FIG. 11B is a timing chart schematically illustrating how the drain-source voltage across the synchronous rectification switch changes with time within the predetermined period before and after turn-off of the synchronous rectification switch;

FIGS. 11C to 11E are each a timing chart schematically illustrating how the corresponding one of the gate voltages of a corresponding one of the main switch, synchronous rectification switch, and an auxiliary switch changes with time within the predetermined period before and after turn-off of the synchronous rectification switch;

FIG. 11F is a timing chart schematically illustrating how transition time changes with time within the predetermined period before and after turn-off of the synchronous rectification switch;

FIG. 12A is a circuit diagram schematically illustrating a first example of the structure of a transition-time signal obtainer illustrated in FIG. 1 when the transition-time signal obtainer obtains the transition time based on the rising waveform of the drain-source voltage across the synchronous rectification switch;

FIG. 12B is a circuit diagram schematically illustrating a second example of the structure of the transition-time signal obtainer when the transition-time signal obtainer obtains the transition-time signal signal indicative of the transition time based on the falling waveform of the drain-source voltage across the main switch;

FIG. 17A is a circuit diagram schematically illustrating a first example of the structure of a transition-time signal obtainer of the power converter according to the second embodiment;

FIG. 17B is a circuit diagram schematically illustrating a second example of the structure of the transition-time signal obtainer of the power converter according to the second embodiment;

DETAILED DESCRIPTION OF EMBODIMENT

Figure 1:
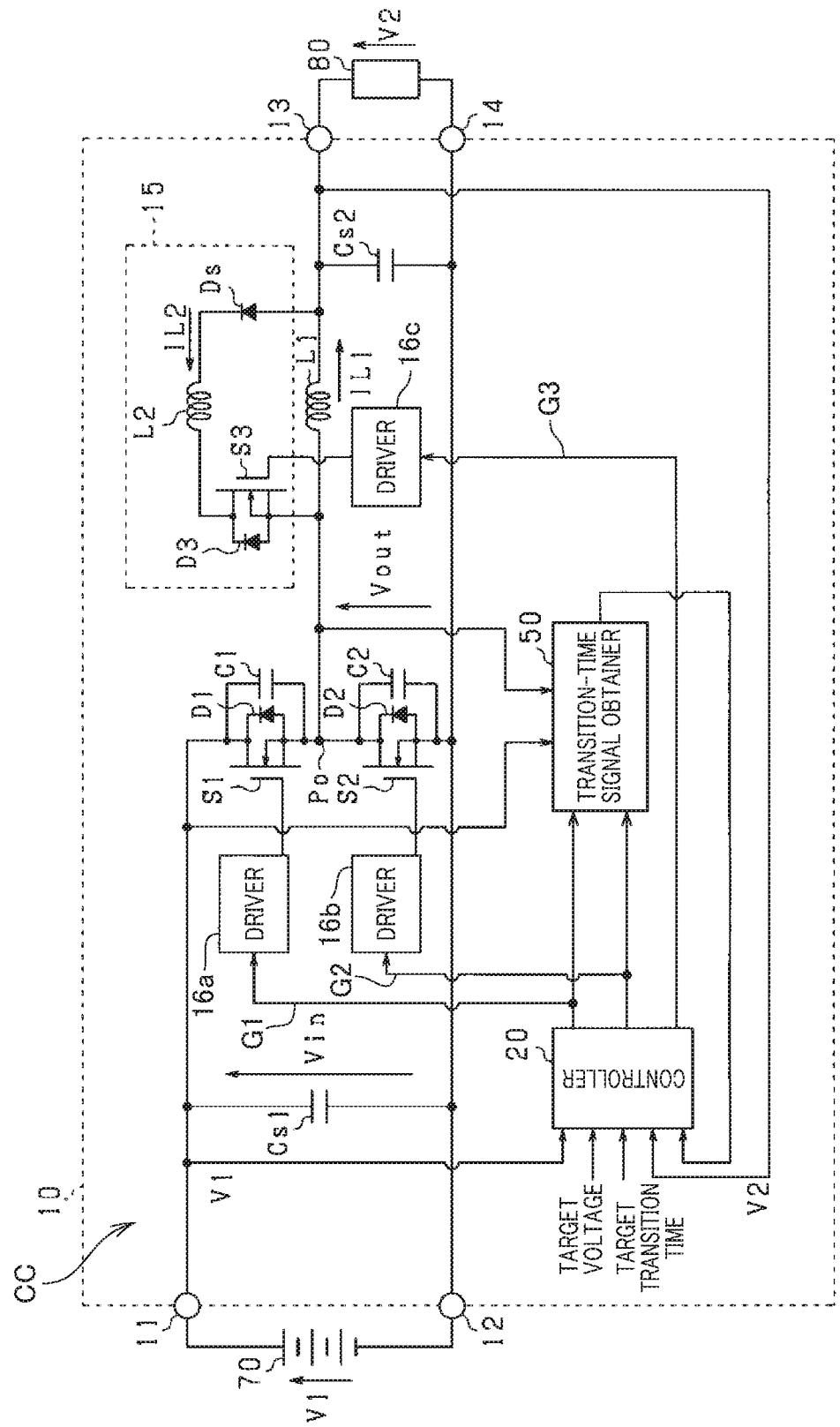
FIG. 1 is a circuit and block diagram schematically illustrating an example of the overall structure of a power converter according to the first embodiment of the present disclosure.

The following describes specific embodiments of the present disclosure with reference to the accompanying drawings. In the embodiments, like parts between the embodiments, to which like reference characters are assigned, are omitted or simplified in order to eliminate redundant description.

First Embodiment

The following describes a power converter 10 according to the first embodiment of the present disclosure; the power converter 10 is a step-down converter as an example of power converters according to the present disclosure.

Referring to FIG. 1, the power converter 10 includes a voltage converter circuit CC, a controller 20, and a transition-time signal obtainer 50; the transition-time signal obtainer 50 serves as, for example, a component of a parameter obtainer. The voltage converter circuit CC is comprised of a main switch S1, also referred to as a switch S1, a synchronous rectification switch S2, also referred to as a switch, S2, a main inductor, i.e. a main reactor, L1, an auxiliary resonance circuit 15, a smoothing capacitor Cs1, a smoothing capacitor Cs2, and drivers 16$a$ and 16$b$. The power converter 10 also includes a driver 16$c$.

A computer-based circuit, which functionally includes the controller 20 and the transition-time signal obtainer 50, can be provided in place of the controller 20 and the transition-time signal obtainer 50.

The power converter 10 has a first pair of high- and low-side terminals 11 and 12 to which the positive and negative terminals of a DC power source 70 are respectively connected. The power converter 10 also has a second pair of high- and low-side terminals 13 and 14 to which high- and low-side input terminals of an electrical load 80 are respectively connected.

The high- and low-side terminals 11 and 12 according to the first embodiment serve as high- and low-side input terminals of the power converter 10, and the high- and low-side terminals 13 and 14 according to the first embodiment serve as high- and low-side output terminals of the power converter 10.

That is, the power converter 10, which serves as a step-down converter, is configured to step down an input voltage V1 input to the high- and low-side terminals 11 and 12, and output, as an output voltage V2, the stepped-down voltage to the electrical load 80 via the high- and low-side terminals 13 and 14.

The switches S1 and S2 are connected in series between the high- and low-side terminals 11 and 12 to form a series switch unit, so that the switch S1 serves as an upper-arm, i.e. a high-side, switch, and the switch S2 serves as a lower-arm, i.e. a low-side, switch. The first embodiment uses an N-channel metal-oxide semiconductor field-effect transistor (MOSFET) as each of the switches S1 and S2. The drain of the switch S1 is connected to the high-side terminal 11, and the source of the switch S1 is connected at a connection point Po to the drain of the switch S2. The source of the switch S2 is connected to the low-side terminal 12.

The drain and source of each of the switches S1 and S2 serve as input and output terminals of the corresponding one of the switches S1 and S2.

The main inductor L1, which serves as, for example, a first magnetic component, has opposing first and second ends. The first end of the main inductor L1 is connected to the connection point Po, and the second end of the main inductor L1 is connected to the high-side terminal 13.

The smoothing capacitor Cs1, which serves as, for example a first smoothing capacitor, is connected between the drain of the switch S1 and the source of the switch S2 in parallel to the DC power source 70. The drain of the switch S1 serve as a high-side terminal of the series switch unit, and the source of the switch S2 serve as a low-side terminal of the series switch unit.

The smoothing capacitor Cs2, which serves as, for example a second smoothing capacitor, is connected between the second end of the main inductor L1 and the source of the switch S2 in parallel to the electrical load 80. Each of the smoothing capacitors Cs1 and Cs2 is configured to stabilize a corresponding one of an input voltage V1 to the terminals 11 and 12 of the power converter 10 and an output voltage V2 of the power converter 10 between the terminals 13 and 14. Note that the same reference characters V1 and V2 are used to represent voltages input to and output from or vice versa in the power converters according to all the embodiments, but values of the voltages V1 and V2 can be independently set for the respective embodiments.

A voltage across the smoothing capacitor Cs1 is also referred to as Vin to be input to the switches S1 and S2, and a voltage across the switch S2 is also referred to as Vout to be output from the switches S1 and S2 to the terminals 13 and 14.

A capacitor C1 is connected across the switch S1 in parallel to the switch S1, and a capacitor C2 is connected across the switch S2 in parallel to the switch S2. A floating capacitance of each of the switches S1 and S2, i.e. the transistors, can serve as the corresponding one of the capacitors C1 and C2. External snubber capacitors can be connected across the respective switches S1 and S2 as the capacitors C1 and C2.

A diode D1 is connected across the switch S1 in antiparallel to the switch S1, and a diode D2 is connected across the switch S2 in antiparallel to the switch S2. An intrinsic diode of each of the switches S1 and S2, i.e. the transistors, can serve as the corresponding one of the diodes D1 and D2.

External diodes can be connected across the respective switches S1 and S2 as the diodes D1 and D2.

The drivers 16a and 16b are connected to respective control terminals, i.e. the respective gates, of the switches S1 and S2. The drivers 16a and 16b perform complementary switching of the switch S1 and the switch S2, so that the switches S1 and S2 are complementarily switched on, i.e. the drivers 16a and 16b perform synchronous rectification.

Specifically, when the switch S1 is on while the switch S2 is off, the DC power source 70 causes a current to flow to the main inductor L1 so that magnetic energy based on the current is stored in the main inductor L1. When the switch S2 is on while the switch S1 is off, the magnetic energy stored in the main inductor L1 causes a current to flow from the main inductor L1 to the electrical load 80 connected to the terminals 13 and 14. This results in the input voltage V1 of the DC power source 70 to the power converter 10 being stepped down to a predetermined voltage. The predetermined stepped-down voltage is output from the terminals 13 and 14 to the electrical load 80.

Specifically, the switch S1 serves as a main switch for power conversion, and the switch S2 serves as a synchronous rectification switch. The switches S1 and S2 and the main inductor L1 constitute a switching circuit of the voltage converter circuit CC.

The auxiliary resonance circuit 15, which also serves as, for example, an auxiliary switching circuit, is connected across the main inductor L1 in parallel to the main inductor L1.

The auxiliary resonance circuit 15 includes an auxiliary switch S3, referred to as a switch S3, an auxiliary inductor L2, which serves as, for example, a second magnetic component, and a diode DS, which serves as, for example, an auxiliary rectification element. The first embodiment uses an N-channel MOSFET as the switch S3. A diode D3 is connected across the switch S3 in antiparallel to the switch S3. An intrinsic diode of the switch S3, i.e. the transistor, can serve as the diode D3. An external diode can be provided to be connected across the switch S3 as the diode D3.

The auxiliary inductor L2 has opposing first and second ends. The source of the switch S3 is connected to the first end of the main inductor L1. The drain of the switch S3 is connected to the first end of the auxiliary inductor L2. The second end of the auxiliary inductor L2 is connected to the cathode of the diode DS, and the anode of the diode DS is connected to the second end of the main inductor L1. The driver 16c is connected to the control terminal, i.e. the gate, of the switch S3. The driver 16c is operative to perform on/off switching of the switch S3.

The controller 20 is designed as, for example, a microcomputer circuit, which includes essentially, for example, a CPU, a memory equipped with a ROM and a RAM, and its peripheral circuit including an I/O unit. The controller 20 is connected to the drivers 16a to 16c. The controller 20 controls each of the drivers 16a and 16b to control on/off switching of the corresponding one of the switches S1 and S2, thus converting input power, i.e. the input voltage V1, into output power, i.e. the output voltage between the high- and low-side terminals 13 and 14.

For example, the controller 20 causes each of the drivers 16a and 16b to (1) Output a turn-on drive signal to the gate of the corresponding one of the switches S1 and S2, thus turning on the corresponding one of the switches S1 and S2

(2) Output a turn-off drive signal to the gate of the corresponding one of the switches S1 and S2, thus turning off the corresponding one of the switches S1 and S2.

Additionally, the controller 20 controls the driver 16c to control on/off switching of the switch S3, thus enabling the capacitors C1 and C2 and the auxiliary inductor L2 to resonate with each other.

Specifically, the controller 20 generates control signals, i.e. gate control signals G1, G2, and G3, for controlling on/off switching of the respective switches S1 to S3, and sends the gate control signals G1 to G3 to the respective drivers 16a to 16c. Each of the gate control signals G1 to G3 has a logical low level represented by 0 or a logical high level represented by 1. Each of the gate control signals G1 to G3 output from the controller 20 causes the corresponding one of the drivers 16a to 16c to turn on the corresponding one of the switches S1 to S3 when the gate control signal represents the logical high level of 1. In contrast, each of the gate control signals output from the controller 20 causes the corresponding one of the drivers 16a to 16c to turn off the corresponding one of the switches S1 to S3 when the gate control signal represents the logical low level of 0.

The transition-time signal obtainer 50 is configured to obtain transition time of each of the switches S1 and S2 between the on state and the off state. The transition time of each of the switches S1 and S2 and the functions of the controller 20 and the transition-time signal obtainer 50 will be described in detail later.

Next, the following describes fundamental operations of the power converter 10 with reference to FIGS. 2A to 10. FIGS. 2A to 2G are a joint timing chart schematically illustrating how predetermined parameters of the power converter 10 change with time.

Specifically, each of FIGS. 2A to 2C is a timing chart schematically illustrating how the corresponding one of the gate voltages Vgs1, Vgs2, and Vgs3 of the corresponding one of the switches S1, S2, and S3 changes with time. In other words, each of FIGS. 2A to 2C schematically illustrates on/off states of the corresponding one of the switches S1 to S3.

Each of FIGS. 2D and 2E is a timing chart schematically illustrating how the corresponding one of the drain-source voltage Vds1 of the switch S1 and the drain-source voltage Vds2 of the switch S2 changes with time. The drain-source voltage Vds1 serves as an input-output terminal voltage of the switch S1, and the drain-source voltage Vds2 serves as an input-output terminal voltage of the switch S2.

FIG. 2F is a timing chart schematically illustrating how an inductor current IL1 flowing through the main inductor L1 changes with time, and FIG. 2G is a timing chart schematically illustrating how an auxiliary current IL2 flowing through the auxiliary inductor L2 change with time.

Each of FIGS. 3A to 3G is a timing chart schematically illustrates an enlarged portion of the corresponding one of the timing charts of FIGS. 2A to 2G within A period illustrated in the corresponding one of FIGS. 2A to 2G.

As illustrated in FIGS. 2A, 2B, 3A, and 3B, the switches S1 and S2 are alternately turned on with predetermined dead times between their on periods. That is, the switch S1 is switched from off to on when the dead time has elapsed since turn-off of the switch S2, and the switch S2 is switched from off to on when the dead time has elapsed since turn-off of the switch S1. Note that the direction in which the inductor current IL1 flows from the connection point Po to the smoothing capacitor Cs2 is defined as a positive direction, so that the direction in which the inductor current IL1 flows from the smoothing capacitor Cs2 to the connection point Po is defined as a negative direction. Additionally, note that the direction in which the auxiliary current IL2 flows from the diode DS to the switch S3 is defined as a positive direction, so that the direction in which the auxiliary current IL2 flows from the switch S3 to the diode DS is defined as a negative direction.

Figure 4:
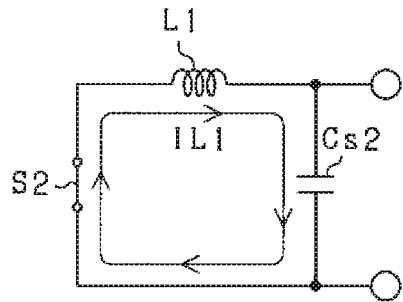
FIG. 4 is a circuit diagram schematically illustrating how the power converter operates within a period from a predetermined reference time until just before first time illustrated in FIGS. 3A to 3G.

FIG. 4 is a circuit diagram schematically illustrating how the power converter 10 operates within the period from predetermined reference time t0 until just before first time t1 illustrated in FIGS. 3A to 3G.

As illustrated in FIG. 4, the switch S1 is off, the switch S2 is on, and the switch S3 is off. For this reason, the inductor current IL1 based on the magnetic energy stored in the main inductor L1 flows through the smoothing capacitor Cs2 and the switch S2 as a flyback current. This results in the magnetic energy stored in the main inductor L1 being discharged to the terminals 13 and 14, and electrical energy based on the inductor current IL1 charging the smoothing capacitor Cs2.

Figure 5:
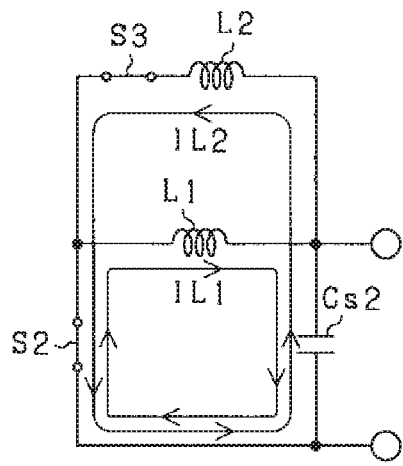
FIG. 5 is a circuit diagram schematically illustrating how the power converter operates within the period from the first time until just before second time illustrated in FIGS. 3A to 3G.

Next, FIG. 5 is a circuit diagram schematically illustrating how the power converter 10 operates within the period from the first time t1 until just before second time t2 illustrated in FIGS. 3A to 3G.

As illustrated in FIGS. 3A to 3G, when the switch S3 is turned on at the first time t1, so that the switch S1 is off, the switch S2 is on, and the switch S3 is on within the period from the first time t1 until just before the second time t2. Because a closed loop is generated through the switches S2 and S3, the auxiliary inductor L2, and the smoothing capacitor Cs2, the auxiliary current IL2 flows through the closed loop. This causes the electrical energy stored in the smoothing capacitor Cs2 to be supplied to the auxiliary inductor L2, so that magnetic energy based on the electrical energy is stored in the auxiliary inductor L2. The longer the period for which the switches S2 and S3 are on together, the larger the magnetic energy stored in the auxiliary inductor L2 is. Note that, if the inductance of the auxiliary inductor L2 were greater than the inductance of the main inductor L1, the change rate of the auxiliary current L2 might decrease, resulting in the rate of rise of the auxiliary current L2 slowing. For this reason, it is preferable that the inductance of the auxiliary inductor L2 is set to be smaller than the inductance of the main inductor L1.

Figure 6:
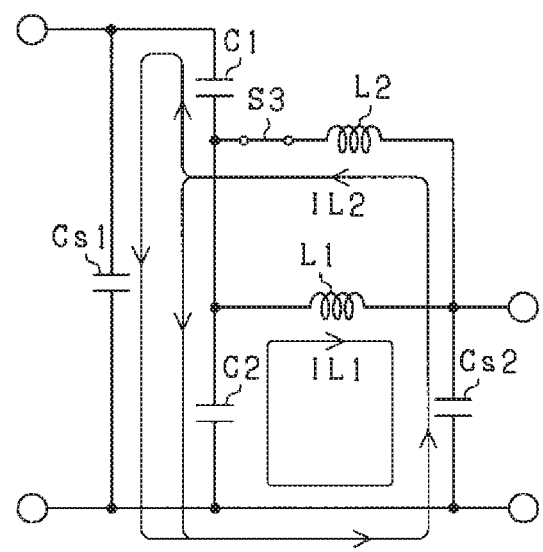
FIG. 6 is a circuit diagram schematically illustrating how the power converter operates while capacitors and an auxiliary inductor of auxiliary circuit illustrated in FIG. 1 resonate with each other.

Additionally, FIG. 6 is a circuit diagram schematically illustrating how the power converter 10 operates while the capacitors C1 and C2 and the auxiliary inductor L2 resonate with each other.

As illustrated in FIGS. 3A to 3G, when the switch S2 is turned off at the second time t2, so that the switch S3 is on, the switch S1 is off, and the switch S2 is off. This causes the capacitors C1 and C2 and the auxiliary inductor L2 resonate with each other. This resonance causes the auxiliary current IL2 to be divided into two currents respectively flowing through the capacitors C1 and C2, resulting in the potential at the connection point Po increasing. That is, the drain-source voltage Vds2 of the switch S2 increases, and the drain-source voltage Vds1 of the switch S1 decreases.

When the auxiliary current IL2 satisfies the predetermined condition defined by the following equation (1) at the second time t2 at which the switch S2 is switched off, the resonance of the capacitors C1 and C2 and the auxiliary inductor L2 causes the drain-source voltage Vds2 of the switch S2 to increase up to the input voltage V1:

$$IL2 > IL1 + \sqrt{\frac{C1a + C2a}{L2a}(V1^2 - V2^2)} \qquad (1)$$

Where C1a and C2a represents the capacitances of the respective capacitors C1 and C2, and L2a represents the inductance of the auxiliary inductor L2. V1 represents the input voltage between the terminals 11 and 12, and V2 represents the output voltage between the terminals 13 and 14.

Descriptions of how to develop the equation (1) are omitted, because they are known in the corresponding technical field. For example, how to develop the equation (1) is disclosed in patent document 1, which is incorporated in its entirely herein by reference.

Figure 7:
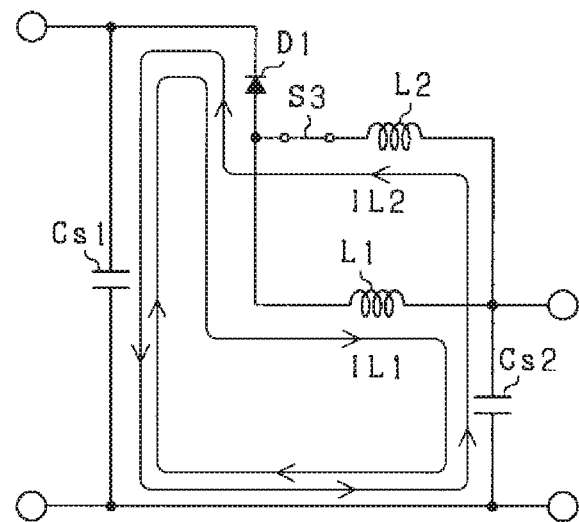
FIG. 7 is a circuit diagram schematically illustrating how the power converter operates when the drain-source voltage across a synchronous rectification switch illustrated in FIG. 1 reaches an input voltage, so that the drain-source voltage across a main switch illustrated in FIG. 1 becomes zero.

Next, FIG. 7 is a circuit diagram schematically illustrating how the power converter 10 operates when the drain-source voltage Vds2 reaches the input voltage V1, so that the drain-source voltage Vds1 becomes zero. The drain-source voltage Vds1, which is zero, enables the auxiliary current IL2 to flow through the diode D1, which can also be described as the diode D1 being on. This results in no current flowing through the capacitor C1, terminating the resonance.

Figure 8:
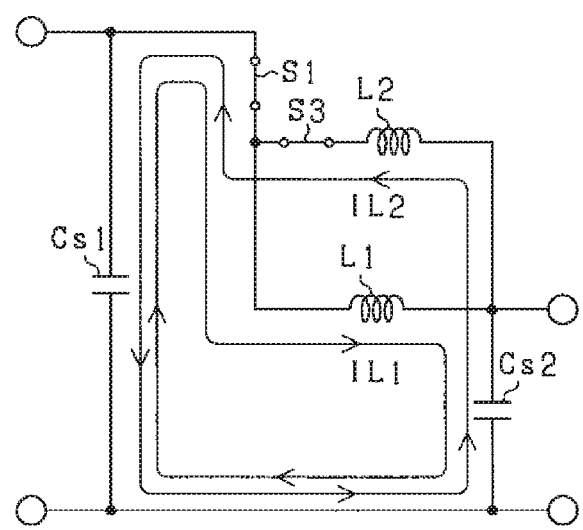
FIG. 8 is a circuit diagram schematically illustrating how the power converter operates within the period from the third time until just before fourth time illustrated in FIGS. 2A to 2G and FIGS. 3A to 3G.

Next, FIG. 8 is a circuit diagram schematically illustrating how the power converter 10 operates within the period from third time t3 until just before fourth time t4 illustrated in FIGS. 2A to 2G and FIGS. 3A to 3G.

The switch S1 is turned on while the diode D1 is on at the third time t3, so that the switches S1 and S3 are on while the switch S2 is off within the period from the third time t3 until just before the fourth time t4. Turning on the switch S1 while the diode D1 is on enables the ZVS control of the switch S1 to be carried out, resulting in turn-on switching loss of the switch S1 being minimized. Note that the period between the second time t2 and the third time t3 represents the dead time.

Figure 9:
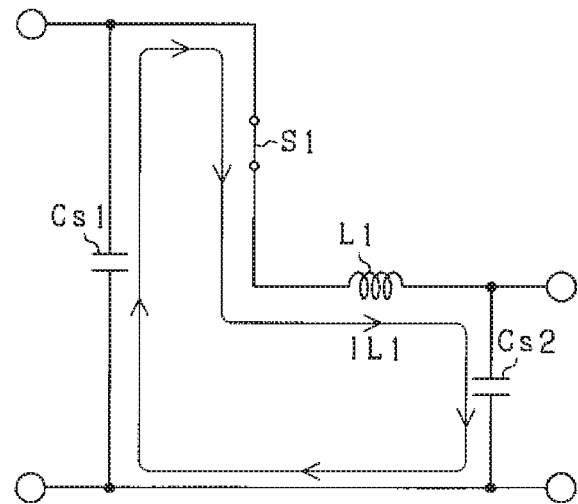
FIG. 9 is a circuit diagram schematically illustrating how the power converter operates within the period from the fourth time until just before fifth time illustrated in FIGS. 2A to 2G.

Additionally, FIG. 9 is a circuit diagram schematically illustrating how the power converter 10 operates within the period from the fourth time t4 until just before fifth time t5 illustrated in FIGS. 2A to 2G.

The switch S3 is turned off at the fourth time t4, so that the switch S1 is only on within the period from the fourth time t4 until just before the fifth time t5. This enables the inductor current IL1 to flow through the main inductor L1 based on electrical power supplied from the DC power source 70, so that the electrical power is stored in the main inductor L1 as magnetic energy.

Figure 10:
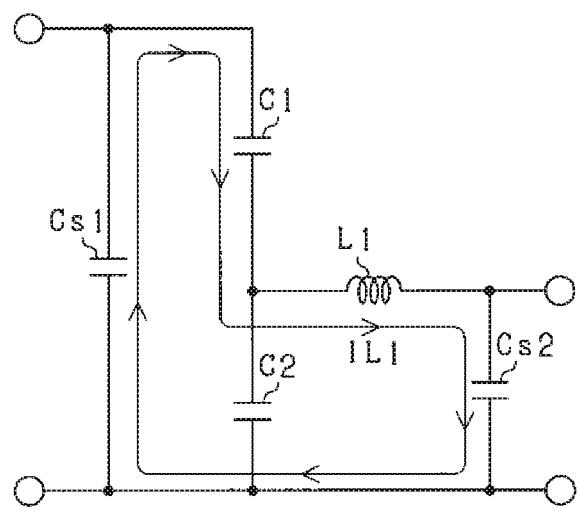
FIG. 10 is a circuit diagram schematically illustrating how the power converter operates at the fifth time at which the main switch is turned off.

Next, FIG. 10 is a circuit diagram schematically illustrating how the power converter 10 operates at the fifth time t5 at which the switch S1 is turned off. This results in all the switches S1 to S3 being off. This enables the inductor current IL1 to flow through the capacitor C1.

As described above, turning off the switch S2 when the auxiliary current IL2 satisfies the condition defined by the equation (1) enables the ZVS control of the switch S1 to be carried out.

In order to detect the timing when the auxiliary current IL2 satisfies the condition defined by the equation (1), a current sensor could be used to measure the auxiliary current IL2, and the switch S2 could be turned off when the measured value of the auxiliary current IL2 satisfies the condition defined by the equation (1).

The auxiliary current IL2 measured by the current sensor varies depending on the variations in ZVS parameters; the ZVS parameters include the input and output voltages V1 and V2, the measurement accuracy of the current sensor, the inductance L2a, the capacitances C1a and C2a, and the temperature characteristics of the power converter 10.

In other words, it could be necessary to cause the auxiliary current IL2 whose level has a margin to flow through the auxiliary resonance circuit 15. The margin enables the auxiliary current IL2 to satisfy the condition defined by the equation (1) so that the ZVS control of the switch S1 can be carried out even if the widest variations of the ZVS parameters are happened.

This could unfortunately result in higher switching loss of each of the switches S2 and S3 due to the margin of the auxiliary current IL2 as compared with the case where the power converter 10 causes the auxiliary current IL2 with no margin or a minimum level to flow through the auxiliary resonance circuit 15. This therefore could result in higher loss of the entire circuit of the power converter 10.

That is, there is a need to use the auxiliary current IL2 having no margin, thus enabling the ZVS control of the switch S1 to be carried out.

In view of this need, the inventors of the present disclosure have focused on the fact that information about the auxiliary current IL2 appears in each of the rising waveform of the drain-source voltage Vds2 and the falling waveform of the drain-source voltage Vds1 after turn-off of the switch S2. The rising waveform of the drain-source voltage Vds2 is complementary to the falling waveform of the drain-source voltage Vds1, because the sum of the drain-source voltage Vds1 and the drain-source voltage Vds2 is maintained at the input voltage V1.

As described above, the longer the period for which the switches S2 and S3 are on together, the larger the magnetic energy stored in the auxiliary inductor L2 is. The larger the magnetic energy stored in the auxiliary inductor L2 is, the more rapidly the voltage across the capacitor C2 rises when the switch S2 is turned off so that the capacitors C1 and C2 and the auxiliary inductor L2 resonate with each other. Specifically, the drain-source voltage Vd2 rises sharply, so that the drain-source voltage Vd1 falls sharply. For this reason, information about the auxiliary current IL2 appears in each of the rising waveform of the drain-source voltage Vds2 and the falling waveform of the drain-source voltage Vds1 after turn-off of the switch S2. Each of the rising waveform of the drain-source voltage Vds2 and the falling waveform of the drain-source voltage Vds1 shows a transient phenomenon of the corresponding one of the drain-source voltage Vds2 and the drain-source voltage Vds1. In other words, each of the rising waveform of the drain-source voltage Vds2 and the falling waveform of the drain-source voltage Vds1 depends on variations of each of the ZVS parameters including (1) The input and output voltages V1 and V2
(2) The inductance L2a
(3) The capacitances C1a and C2a
(4) The temperature characteristics of the power converter 10.

FIG. 11A is a timing chart schematically illustrating how the auxiliary current IL2 changes with time within a predetermined period before and after turn-off of the switch S2.

FIG. 11B is a timing chart schematically illustrating how the drain-source voltage Vds2 changes with time within the predetermined period before and after turn-off of the switch S2.

Each of FIGS. 11C to 11E is a timing chart schematically illustrating how the corresponding one of the gate voltages Vgs1, Vgs2, and Vgs3 of the corresponding one of the switches S1, S2, and S3 changes with time within the predetermined period before and after turn-off of the switch S2.

FIG. 11F is a timing chart schematically illustrating how transition time changes with time within the predetermined period before and after turn-off of the switch S2. Note that the transition time, referred to as transition time Ta, is defined as the period from the start of the rising of the drain-source voltage Vds2 to the end of the rising of the drain-source voltage Vds2. The transition time Ta is also defined as the period from the start of the falling of the drain-source voltage Vds1 to the end of the falling of the drain-source voltage Vds1.

Each of FIGS. 11A, 11B, 11E, and 11F illustrates an optimum transient curve TC1 of the auxiliary current IL2 when the auxiliary current IL2 has no margin; the optimum transient curve TC1 is illustrated by a solid line.

Each of FIGS. 11A, 11B, 11E, and 11F also illustrates an over transient curve TC2 of the auxiliary current IL2; the excessive transient curve TC2 of the auxiliary current IL2 is higher than the optimum transient curve TC1 of the auxiliary current IL2 due to the positive-side variation of the total of the ZVS parameters.

Each of FIGS. 11A, 11B, 11E, and 11F further illustrates an under transient curve TC3 of the auxiliary current IL2; the under transient curve TC3 of the auxiliary current IL2 is lower than the optimum transient curve TC1 of the auxiliary current IL2 due to the negative-side variation of the total of the ZVS parameters.

The rising slope and falling slope of the auxiliary current IL2 depend on the inductance L2a of the auxiliary inductor L2.

For this reason, if turn-on timing of the switch S3 were earlier than an optimum timing, the period for which the second and third switches S2 and S3 are on together could be longer than an optimum period. This could result in the auxiliary current IL2 becoming excessive when the switch S2 is turned off. That is, the rising waveform of the drain-source voltage Vds2 based on the excessive auxiliary current IL2 could rise more rapidly than the rising waveform of the drain-source voltage Vds2 based on the optimum auxiliary current IL2.

In addition, if turn-on timing of the switch S3 were slower than the optimum timing, the period for which the second and third switches S2 and S3 are on together could be shorter than the optimum period. This could result in the auxiliary current IL2 could become smaller when the switch S2 is turned off. That is, the rising waveform of the drain-source voltage Vds2 based on the smaller auxiliary current IL2 could rise more gradually than the rising waveform of the drain-source voltage Vds2 based on the optimum auxiliary current IL2. This could result in the drain-source voltage Vds2 being lower than the input voltage V1, making it difficult to carry out the ZVS of the switch S1.

In view of these circumstances, the power converter 10 according to the first embodiment is configured to (1) Detect the rising waveform of the drain-source voltage Vds2 or the falling waveform of the drain-source voltage Vds1

(2) Generate the control signal to the driver 16c for the switch S3 such that the rising waveform of the drain-source voltage Vds2 or the falling waveform of the drain-source voltage Vds1 becomes a predetermined target waveform corresponding to the optimum transient curve TC1 of the auxiliary current IL2.

This enables the optimum auxiliary current IL2 to flow through the auxiliary resonance circuit 15.

As a specific example, the power converter 10 according to the first embodiment is configured to obtain the transition time Ta as a parameter indicative of one of the rising waveform of the drain-source voltage Vds2 and the falling waveform of the drain-source voltage Vds1. Note that the transition time Ta represents the period from the start of the rising of the drain-source voltage Vds2 up to a predetermined level of the drain-source voltage Vds2 or the period from the start of the falling of the drain-source voltage Vds1 down to a predetermined level of the drain-source voltage Vds1.

Then, the power converter 10 is configured to adjust turn-on timing of the switch S3 to cause the measured transition time Ta to be adjusted to predetermined target transition time Tr. The target transition time Tr enables the rising waveform of the drain-source voltage Vds2 or the falling waveform of the drain-source voltage Vds1 to become the corresponding predetermined target waveform corresponding to the optimum transient curve TC1 of the auxiliary current IL2.

In particular, the power converter 10 is configured to count, as an example of the transition time Ta, time from turn-off timing to the switch S2 to timing at which the drain-source voltage Vds2 reaches a threshold voltage Vth as the predetermined level; the threshold voltage Vth is for example 90% of the input voltage V1.

That is, the switch S2 starts to turn-off operation in response to the turn-off drive signal sent from the driver 16b, and is completely turned off when the drain-source voltage Vds2 exceeds the threshold voltage Vth.

FIG. 12A schematically illustrates a first example of the structure of the transition-time signal obtainer 50 when the transition-time signal obtainer 50 obtains a transition-time signal indicative of the transition time Ta based on the rising waveform of the drain-source voltage Vds2.

The transition-time signal obtainer 50 includes a voltage comparator 51 and an XOR circuit 53. The voltage comparator 51 includes resistors R1 to R4 and a comparator 52. Each of the resistors R1 to R4 has opposing first and second ends. The comparator 52 has a non-inverting input terminal, an inverting input terminal, and an output terminal. The XOR circuit 53 has first and second input terminals and an output terminal. The output terminal of the XOR circuit 53 is connected to the controller 20.

The first end of the resistor R1 is connected to the high-side terminal 11 of the power converter 10, and the second end of the resistor R1 is connected to the first end of the resistor R2. The second end of the resistor R2 is connected to the low-side terminal 12 of the power converter 10.

The first end of the resistor R3 is connected to the first end of the main inductor L1, and the second end of the resistor R3 is connected to the first end of the resistor R4. The second end of the resistor R4 is connected to the low-side terminal 12 of the power converter 10.

The connection point between the second end of the resistor R1 and the first end of the resistor R2 is connected to the non-inverting input terminal of the comparator 52. The connection point between the second end of the resistor R3 and the first end of the resistor R4 is connected to the inverting input terminal of the comparator 52.

The output terminal of the comparator 52 is connected to the first input terminal of the XOR circuit 53.

The resistors R1 and R2 serve as a voltage divider to divide the input voltage V1 into a divided voltage defined by $(R2a)/(R1a+R2a)$ where R1a represents the resistance of the resistor R1, and R2a represents the resistance of the resistor R2. The divided voltage serves as the threshold voltage Vth. That is, the threshold voltage Vth is input to the non-inverting input terminal of the comparator 52. Adjustment of the resistances of the resistors R3 and R4 enables the drain-source voltage Vds2 to be input to the inverting input terminal of the comparator 52.

The comparator 52 outputs, for example, a signal having a logical high level, represented by 1 when the drain-source voltage Vds2 is lower than the threshold voltage Vth. In contrast, the comparator 52 outputs, for example, a signal having a logical low level, represented by 0 when the drain-source voltage Vds2 is higher than the threshold voltage Vth.

The output of the comparator 52 is input to the first input terminal of the XOR circuit 53, and the gate control signal G2 for the switch S2 is input to the second input terminal of the XOR circuit 53.

The XOR circuit 53 outputs a logical high level of 1 when the output of the comparator 52 is the logical high level of 1 and the gate control signal G2 for the switch S2 is the logical low level of 0. In contrast, the XOR circuit 53 outputs a logical low level of 0 when the output of the comparator 52 is the logical low level of 0 and the gate control signal G2 for the switch S2 is the logical low level of 0.

This results in the output of the XOR circuit 53 being maintained at the logical high level of 1 within the period from turn-off instruction to the switch S2 to the timing when the drain-source voltage Vds2 reaches the threshold Vth. That is, the output of the XOR circuit 53 is switched from the logical high level of 1 to the logical low level of 0 when the drain-source voltage Vds2 exceeds the threshold Vth.

That is, the period for which the output of the XOR circuit 53 is the logical high level of 1 represents the transition time Ta as the parameter indicative of the rising waveform of the drain-source voltage Vds2 according to the first example. This enables the controller 20 to measure the logical high-level duration of the output signal of the XOR circuit 53 as the transition time Ta using, for example, a known capturing function of the microcomputer installed in the microcomputer.

In addition, FIG. 12B schematically illustrates a second example of the structure of the transition-time signal obtainer 50 when the transition-time signal obtainer 50 obtains the transition-time signal indicative of the transition time Ta based on the falling waveform of the drain-source voltage Vds1.

As illustrated in FIG. 12B, the power converter 10 can be configured to count, as the transition time Ta, time from turn-off timing to the switch S2 to timing at which the drain-source voltage Vds1 reaches a threshold voltage Vth; the threshold voltage Vth is for example 10% of the input voltage V1.

That is, the switch S1 starts to turn-on operation in response to the turn-on drive signal sent from the driver 16a, and is completely turned on when the drain-source voltage Vds1 becomes lower than the threshold voltage Vth.

Specifically, the voltage comparator 51 can be configured such that the drain-source voltage Vds1 is input to the non-inverting input terminal of the comparator 52, and the threshold voltage Vth is input to the inverting input terminal of the comparator 52. This enables the comparator 52 to output (1) A signal having the logical low level of 1 when the drain-source voltage Vds1 is equal to or higher than the threshold voltage Vth (2) A signal having the logical low level of 0 when the drain-source voltage Vds1 becomes lower than the threshold voltage Vth.

The output of the comparator 52 is input to the first input terminal of the XOR circuit 53, and the gate control signal G2 for the switch S2 is input to the second input terminal of the XOR circuit 53.

The XOR circuit 53 outputs a logical high level of 1 when the output of the comparator 52 is the logical high level of 1 and the gate control signal G2 for the switch S2 is the logical low level of 0. In contrast, the XOR circuit 53 outputs a logical low level of 0 when the output of the comparator 52 is the logical low level of 0 and the gate control signal G2 for the switch S2 is the logical low level of 0.

This results in the output of the XOR circuit 53 being maintained at the logical high level of 1 within the period from turn-off instruction to the switch S2 to the timing when the drain-source voltage Vds1 becomes lower than the threshold Vth. That is, the output of the XOR circuit 53 is switched from the logical high level of 1 to the logical low level of 0 when the drain-source voltage Vds1 becomes lower than the threshold Vth.

The period for which the output of the XOR circuit 53 is the logical high level of 1 represents the transition time Ta as the parameter indicative of the falling waveform of the drain-source voltage Vds1 according to the second example. That is, the period for which the output of the XOR circuit 53 is the logical high level of 1 represents the transition time Ta. This enables the controller 20 to measure the logical high-level duration of the output signal of the XOR circuit 53 as the transition time Ta using, for example, the known capturing function of the microcomputer installed in the microcomputer.

To sum up, the XOR circuit 53, i.e. the transition-time signal obtainer, outputs a transition-time signal indicative of the transition time Ta that represents one of (1) The rising waveform of the drain-source voltage Vds2.

(2) The falling waveform of the drain-source voltage Vds1

Note that, as illustrated in FIG. 17A described later, the voltage comparator 51 can determine the threshold voltage Vth using a voltage, which is other than the input voltage V1, based on another power source.

As illustrated in FIGS. 11A and 11F, the transition time Ta becomes the period from time t10 to time t12 when the auxiliary current IL2 is optimum, i.e. the auxiliary current IL2 has the optimum transient curve TC1. The transition time Ta corresponding to the period from the time t10 to the time t12 is defined as the target transition time Tr. How the target transition time Tr is determined will be described later.

The transition time Ta becomes shorter than the target transition time Tr when the auxiliary current IL2 has the over transient curve TC2 higher than the optimum transient curve TC1.

In addition, the transition time Ta becomes longer than the target transition time Tr when the auxiliary current IL2 has the under transient curve TC3 lower than the optimum transient curve TC1.

That is, the controller 20 controls turn-on timing of the switch S3 such that the measured transition time Ta becomes the target transition time Tr.

Next, the following describes how the target transition time Tr is determined.

When the capacitors C1 and C2 and the auxiliary inductor L2 resonate with each other, the resonance frequency fr is represented by the following equation (2):

$$fr = \frac{1}{2\pi\sqrt{LC}} \quad (2)$$

Where L is equal to the inductance L2a of the auxiliary inductor L2, and C represents the sum of the capacitance C1a of the capacitor C1 and the capacitance C2a of the capacitor C2. The resonance period τr is expressed by τ=1/fr based on the equation (2).

If each of the capacitors C1 and C2 consists of only a floating capacitance, each of the capacitances C1a and C2a is the floating capacitance of the corresponding one of the capacitors C1 and C2. If each of the capacitors C1 and C2 consists of a snubber capacitor and a floating capacitance, each of the capacitances C1a and C2a is the sum of the capacitance of the snubber capacitor and the floating capacitance of the corresponding one of the capacitors C1 and C2.

Figure 13:
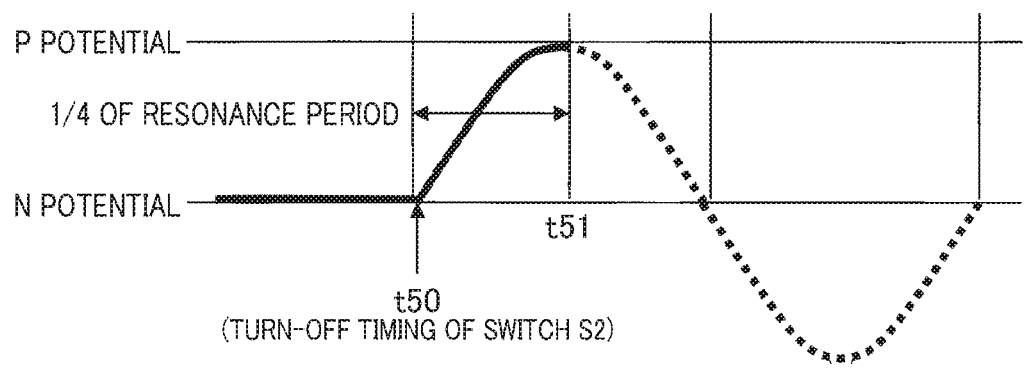
FIG. 13 is a graph schematically illustrating how the potential at the connection point between the main switch and the synchronous rectification switch changes over time when the capacitors and the auxiliary inductor of the auxiliary circuit resonate with each other.

FIG. 13 schematically illustrates how the potential at the connection point Po changes over time when the capacitors C1 and C2 and the auxiliary inductor L2 resonate with each other.

Specifically, when the switch S2 is turned off at time t50 so that the resonance between the capacitors C1 and C2 and the auxiliary inductor L2 is started while the potential at the connection point Po is an N potential before turn-off of the switch S2, all the magnetic energy stored in the auxiliary inductor L2 is theoretically transferred to the capacitors C1 and C2 at time t51 at which (¼), i.e. fourth part, of the resonance period it has elapsed since the time t50. This results in the potential at the connection point Po theoretically increasing up to the input voltage V1 at the time t51 (see P potential in FIG. 13).

Figure 14:
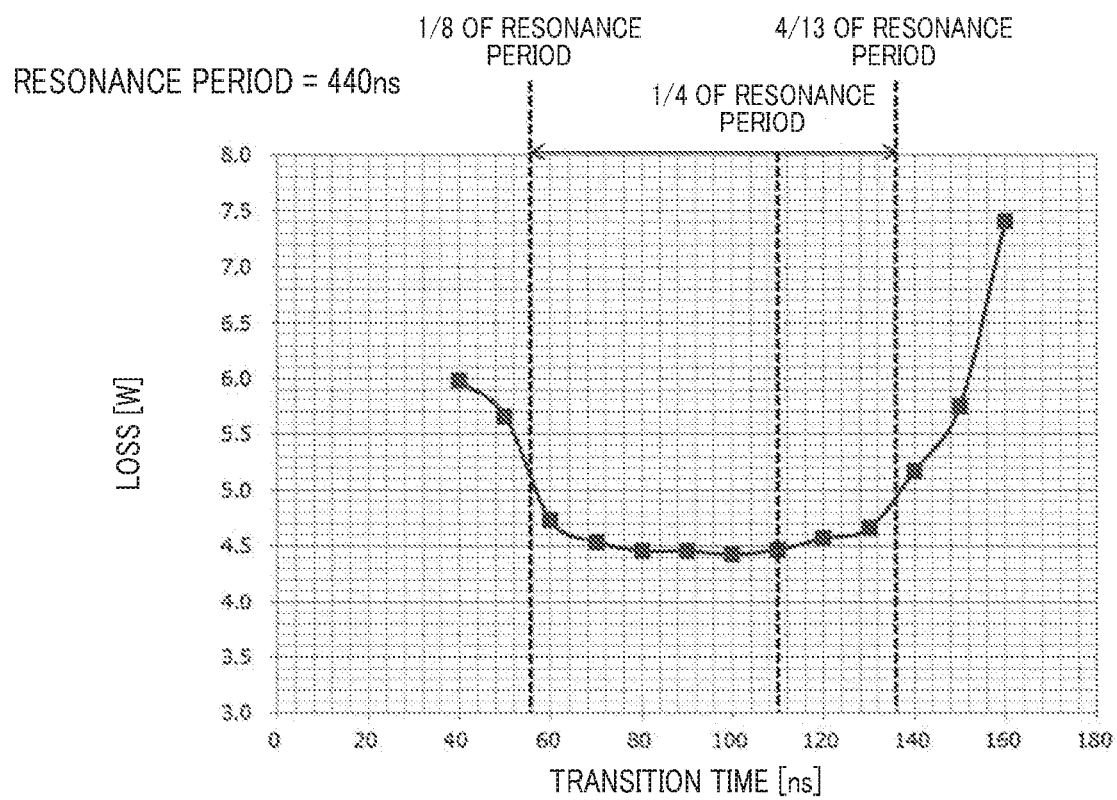
FIG. 14 is a graph schematically illustrating a simulation result representing how loss of the power converter changes while a variable indicative of the transition time varies.

The inventors carried out simulations of how loss of the power converter 10 changes while a variable indicative of the transition time Ta varies. FIG. 14 schematically illustrates the simulation results. FIG. 14 shows that the amount of change of the loss per unit of the transition time Ta is set to be lower than a corresponding predetermined amount when a value of the transition time Ta lies within a predetermined range including the one-fourth of the resonance period τr. which is set to, for example, 440 ns.

In particular, FIG. 14 shows that the amount of increase of the loss relative to the minimum loss while a value of the target transition time Tr is set within a predetermined range from (⅛), i.e. an eighth part, of the resonance period τr to (4/13), i.e. four-thirteenths, of the resonance period τr inclusive is limited to be equal to or lower than approximately 0.5 W, in other words, approximately 10%.

The target transition time Tr according to the first embodiment is set to (⅛) of the resonance period τr at which loss of the power converter 10 is theoretically minimized; the target transition time Tr is therefore expressed by the following equation (3):

$$Tr = \frac{\tau r}{4} = \frac{\pi\sqrt{LC}}{2} \qquad (3)$$

The target transition time Tr according to the first embodiment can also be set to a value within the range from (¼) of the resonance period τr to (4/13) of the resonance period τr inclusive; the range covers the delays due to the operations in the transition-time signal obtainer 50 and/or the switches S1 and S2.

Figure 15:
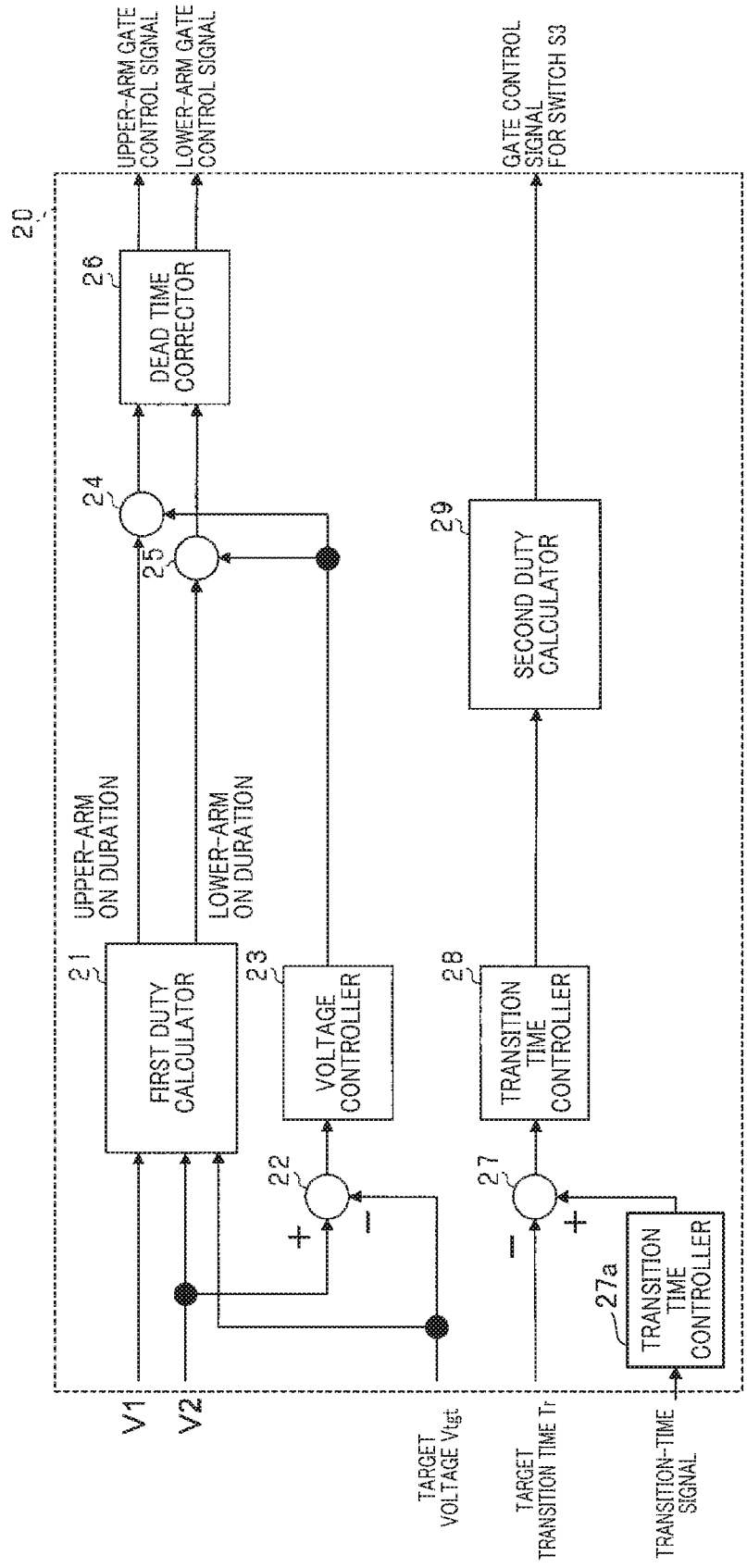
FIG. 15 is a functional diagram schematically illustrating an example of functions of a controller illustrated in FIG. 1.

Next, the following describes detailed functions of the controller 20 with reference to FIG. 15.

Referring to FIG. 15, the controller 20 functionally includes a first duty calculator 21, a voltage deviation calculator 22, a voltage controller 23, an upper-arm corrector 24, a lower-arm corrector 25, a dead time corrector 26, a transition time calculator 27a, a time deviation calculator 27, a transition time controller 28, and a second duty calculator 29.

The first duty calculator 21 measures the input voltage V1 between the high- and low-side terminals 11 and 12, and the output voltage V2 between the high- and low-side terminals 13 and 14; the output voltage V2 is a voltage actually applied to the electrical load 80. Then, the first duty calculator 21 calculates, based on the input voltage V1 and the output voltage V2, (1) An upper-arm duty, i.e. an upper-arm duty cycle, for each switching period of the switch S1

(2) A lower-arm duty, i.e. a lower-arm duty cycle, for each switching period of the switch S2.

The upper-arm duty represents a controllable duty ratio, i.e. percentage, of an on duration to a total duration of the switch S1 for a switching period of the switch S1, and the lower-arm duty represents a controllable duty ratio, i.e. percentage, of an on duration to a total duration of the switch S2 for a switching period of the switch S2.

The voltage deviation calculator 22 receives a predetermined target voltage Vtgt for the electrical load 80 when the predetermined target voltage Vtgt is, for example, input thereto by a user or input thereto from a host computer of the controller 20. Then, the voltage deviation calculator 22 calculates the voltage deviation of the measured output voltage V2 from the target voltage Vtgt.

The voltage deviation of the measured output voltage V2 from the target voltage Vtgt is fed back to the voltage controller 23.

The voltage controller 23 calculates, based on the calculated voltage deviation fed back thereto, an upper-arm correction of the calculated upper-arm duty for the switch S1 and a lower-arm correction of the calculated lower-arm duty for the switch S2 such that the output voltage V2 becomes the target voltage Vtgt. For example, the voltage controller 23 calculates (1) An upper-arm correction of the upper-arm duty for the switch S1 to reduce the on duration based on the upper-arm duty (2) A lower-arm correction of the lower-arm duty for the switch S2 to increase the on duration based on the lower-arm duty when the measured output voltage V2 is higher than the target voltage Vtgt.

When, for example, the measured output voltage V2 is higher than the target voltage Vtgt, the upper-arm corrector 24 subtracts the calculated upper-arm correction from the on duration of the switch S1 based on the upper-arm duty for the switch S1, thus correcting the on duration of the switch S1 based on the upper-arm duty for the switch S1. Similarly, when, for example, the measured output voltage V2 is higher than the target voltage Vtgt, the lower-arm corrector 25 adds the calculated lower-arm correction to the on duration of the switch S2 based on the lower-arm duty for the switch S2, thus correcting the on duration of the switch S2 based on the lower-arm duty for the switch S2.

In contrast, when, for example, the measured output voltage V2 is lower than the target voltage Vtgt, the upper-arm corrector 24 adds the calculated upper-arm correction to the on duration of the switch S1 based on the upper-arm duty for the switch S1, thus correcting the on duration of the switch S1 based on the upper-arm duty for the switch S1. Similarly, when, for example, the measured output voltage V2 is lower than the target voltage Vtgt, the lower-arm corrector 25 subtracts the calculated lower-arm correction from the on duration of the switch S2 based on the lower-arm duty for the switch S2, thus correcting the on duration of the switch S2 based on the lower-arm duty for the switch S2.

The dead time corrector 26 provides predetermined dead time to each of the upper-arm duty corrected by the upper-arm corrector 24 and the lower-arm duty corrected by the lower-arm corrector 25. This generates each of the gate control signal G1 for the switch S1 and the gate control signal G2 for the switch S2 accordingly; the gate control signal G1 is sent to the driver 16a, and the gate control signal G2 is sent to the driver 16b.

On the other hand, the transition time calculator 27a receives the transition-time signal output from the transition-time signal obtainer 50, and calculates, based on the transition-time signal, the transition time Ta described above.

The time deviation calculator 27 receives the target transition time Tr when the target transition time Tr is input thereto by a user, or stores the target transition time Tr beforehand. The time deviation calculator 27 also receives the transition time Ta calculated by the transition time calculator 26a. The transition time calculator 26a can be installed in the transition-time signal obtainer 50, so that the time deviation calculator 27 can receive the transition time Ta directly from the transition-time signal obtainer 50.

Then, the time deviation calculator 27 calculates the time deviation of the calculated transition time Ta from the target transition time Tr. The time deviation of the calculated transition time Ta from the target transition time Tr is fed back to the transition time controller 28.

The transition time controller 28 determines, based on the target transition time Tr and, for example, a relationship between the variable of the target transition time Tr and the variable of the duty for the switch S3, a value of the duty for the switch S3, which corresponds to the target transition time Tr. The duty for the switch S3 represents a controllable ratio, i.e. percentage, of an on duration to a total duration of the switch S3 for a switching period of the switch S3.

Then, the transition time controller 28 calculates, based on the calculated time deviation fed back thereto, a correction of the determined duty for the switch S3 such that the transition time Ta becomes the target transition time Tr.

For example, the transition time controller 28 calculates a correction of the duty for the switch S3 to make earlier the on timing of the switch S3 to increase the on duration based on the determined duty for the switch S3 when the transition time Ta is longer than the target transition time Tr.

As another example, the transition time controller 28 calculates a correction of the duty for the switch S3 to make later the on timing of the switch S3 to reduce the on duration based on the determined duty for the switch S3 when the transition time Ta is shorter than the target transition time Tr.

The second duty calculator 29 corrects the determined duty for the switch S3 based on the calculated correction of the duty for the switch S3. This correction enables the on timing of the switch S3 to be earlier than the on timing based on the determined duty when the transition time Ta is longer than the target transition time Tr. This correction also enables the on timing of the switch S3 to be later than the on timing based on the determined duty when the transition time Ta is shorter than the target transition time Tr.

Then, the second duty calculator 29 generates, based on the corrected duty for the switch S3, the gate control signal G3 for the switch S3 to be sent to the driver 16c.

The control loop from the first duty calculator 21 to the dead time corrector 26 serve to perform voltage conversion to feedback control the output voltage V2 to match with or follow the target voltage Vtgt for the electrical load 80.

On the other hand, the control loop from the transition time calculator 27a to the second duty calculator 29 serve to perform the ZVS control for the switch S1 by feedback controlling the measured transition time Ta to match with or follow the target transition time Tr.

That is, the controller 20 performs the voltage conversion and the ZVS control for the switch S1 individually. This enables the controller 20 to set the switching period of the switch S3 to be faster than the switching period of each of the switches S1 and S2, resulting in the ZVS control for the switch S1 being faster than the voltage conversion control.

Note that the control loop from the first duty calculator 21 to the dead time corrector 26 of the controller 20 according to the first embodiment performs the voltage conversion to convert the input voltage V1 to the target voltage Vtgt for the electrical load 80 using the input voltage V1, the output voltage V2, and the target voltage Vtgt. The control loop from the first duty calculator 21 to the dead time corrector 26 of the controller 20 according to the present disclosure is not limited to this configuration.

Specifically, the control loop from the first duty calculator 21 to the dead time corrector 26 of the controller 20 can be configured to (1) Measure an input current I1 flowing through the high-side terminal 11 and an output current I2 flowing through the high-side terminal 13 in place of the input and output voltages V1 and V2

(2) Receive a predetermined target current Itgt for the electrical load 80 when the predetermined target current Itgt is, for example, input by a user or input from the host computer of the controller 20

(3) Calculate the current deviation of the measured output current I2 from the target current Itgt (4) Calculate, based on the calculated current deviation, an upper-arm correction of the calculated upper-arm duty for the switch S1 and a lower-arm correction of the calculated lower-arm duty for the switch S2 such that the output current I2 becomes the target current Itgt (5) Provide a predetermined dead time to each of the upper-arm duty corrected by the upper-arm corrector 24 and the lower-arm duty corrected by the lower-arm corrector 25, thus generating each of the gate control signal G1 for the switch S1 and the gate control signal G2 for the switch S2 accordingly.

As described in detail above, the power converter 10 according to the first embodiment is configured to adjust the parameter indicative of the rising waveform of the drain-source voltage Vds2 or indicative of the falling waveform of the drain-source voltage Vds1 in accordance with a predetermined optimum value of the parameter. Then, the power converter 10 is configured to adjust turn-on timing of the switch S3 based on the adjusted parameter, thus enabling the ZVS control for turn-on of the switch S1 to be carried out. That is, this configuration enables the ZVS control for turn-on of the switch S1 to be carried out while the auxiliary current has no or little margin even if the rising waveform of the drain-source voltage Vds2 or the falling waveform of the drain-source voltage Vds1 deviates from a corresponding optimum one.

Additionally, the power converter 10 according to the first embodiment enables the optimum ZVS control for turn-on of the switch S1 to be carried out without using an sensor for directly measuring the auxiliary current IL2 flowing through the auxiliary circuit 15. This results in the power converter 10 having lower cost due to the elimination of such a current sensor.

Specifically, the power converter 10 is configured to compare the measured actual transition time Ta as the parameter indicative of one of the rising waveform of the drain-source voltage Vds2 and the falling waveform of the drain-source voltage Vds1 with the target transition time Tr based on the optimum transient curve TC1 of the auxiliary current IL2. This comparison result enables the switch S3 to be turned on at proper timing at which the actual transition time Ta matches with the target transition time Tr, making it possible to easily carry out the optimum ZVS control for turn-on of the switch S1.

In addition, the power converter 10 is configured to individually perform (1) The voltage conversion to convert the input voltage V1 to the target voltage Vtgt for the electrical load 80 using the synchronous rectification based on the switches S1 and S2

(2) The ZVS control for the switch S1 using on-off switching control of the switch S3.

This enables the power converter 10 to perform the ZVS control for the switch S1 to be faster than the voltage conversion control.

In particular, the power converter 10 is configured to (1) Control, based on the voltage deviation between the target voltage Vtgt and the output voltage V2, the output voltage V2 to match with or follow the target voltage Vtgt for the electrical load 80

(2) Control, based on the time deviation between the target transition time Tr and the transition time Ta, the transition time Ta to match with or follow the target transition time Tr.

This configuration enables both the feedback control of the output voltage V2 and the feedback control of the transition time Ta to be parallely carried out.

The power converter 10 is further configured to perform the ZVS control for the switch S1 using (¼) of the resonance period τr as the target transition time Tr. This enables turn-on switching loss of the switch S1 to be theoretically minimized.

Second Embodiment

Figure 16:
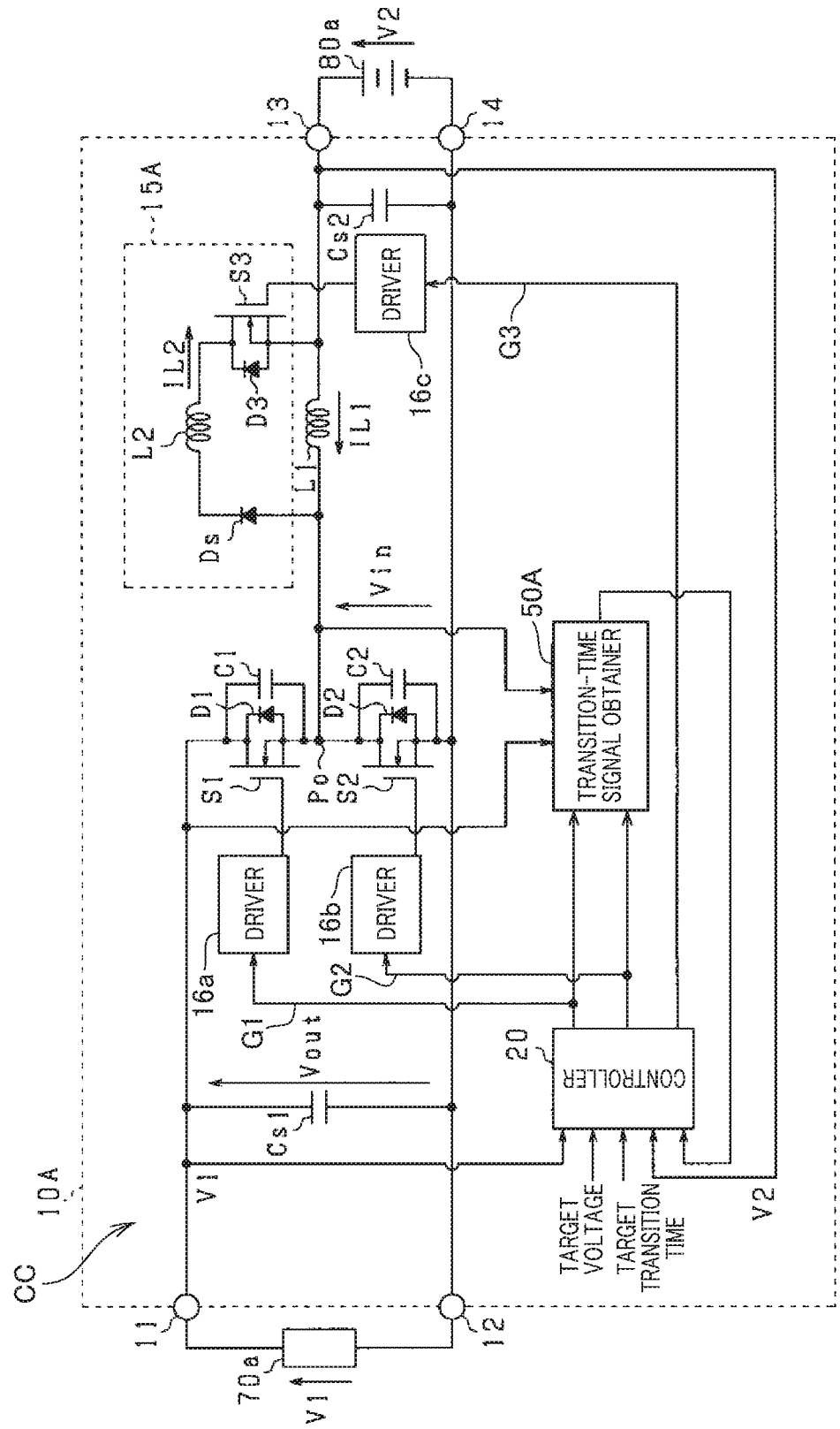
FIG. 16 is a circuit and block diagram schematically illustrating an example of the overall structure of a power converter according to the second embodiment of the present disclosure.
Figure 18:
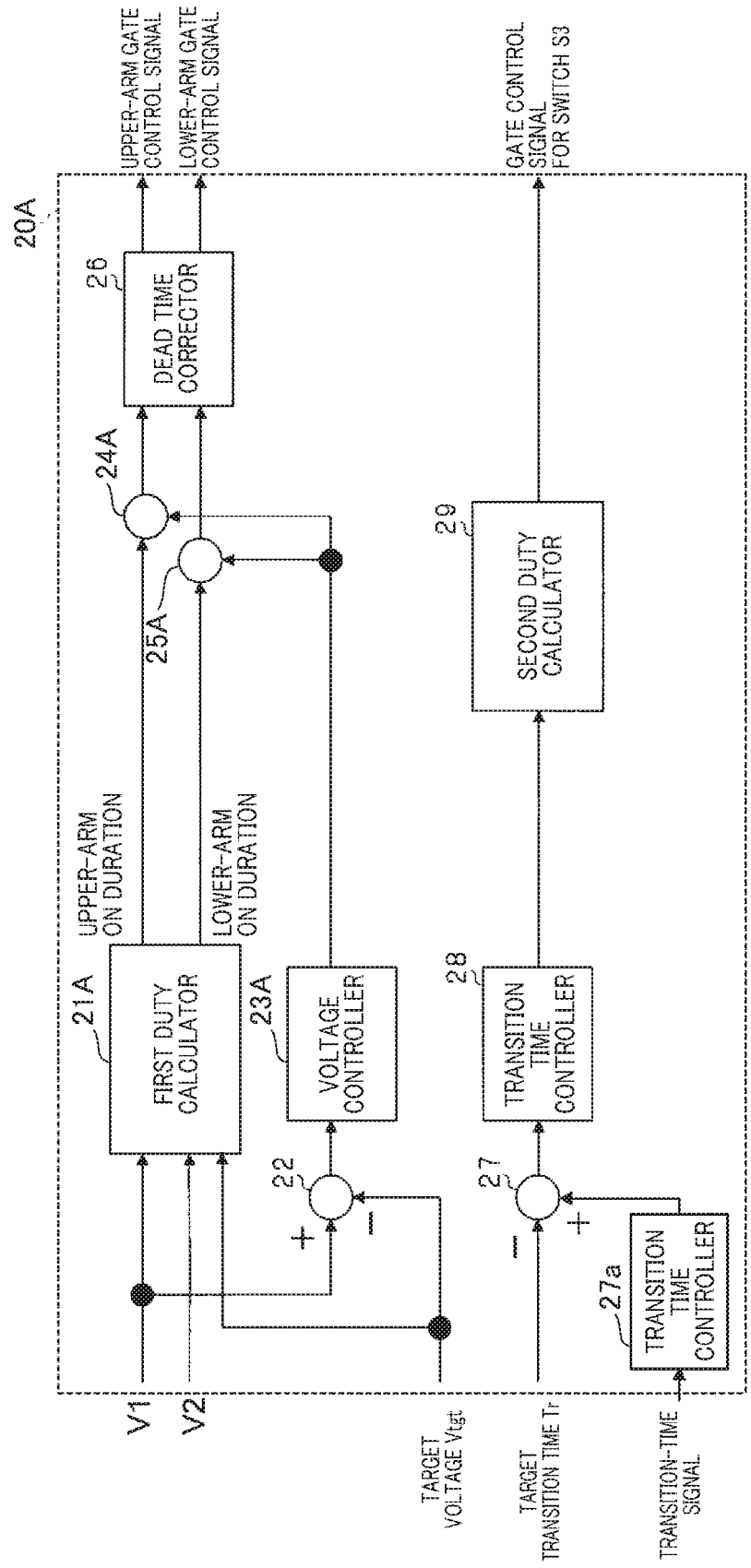
FIG. 18 is a functional diagram schematically illustrating an example of functions of the controller illustrated in FIG. 16.

The following describes a power converter 10A according to the second embodiment of the present disclosure with reference to FIGS. 16 to 18.

The structure and functions of the power converter 10A according to the second embodiment are slightly different from those of the power converter 10 according to the first embodiment by the following points. So, the different points will be mainly described hereinafter.

Referring to FIG. 16, the high- and low-side terminals 11 and 12 of the power converter 10A serve as high- and low-side output terminals of the power converter 10A to which high- and low-side input terminals of an electrical load 70a are respectively connected. The high- and low-side terminals 13 and 14 to which the positive and negative terminals of a DC power source 80a are respectively connected.

That is, the power converter 10A, which serves as a step-up converter, is configured to step up an input voltage V2 of the DC power source 80a input to the high- and low-side terminals 13 and 14, and output the stepped-up voltage to the electrical load 70a via the high- and low-side terminals 11 and 12 as an output voltage V1.

The power converter 10A includes an auxiliary resonance circuit 15A whose connection structure differs from the connection structure of the auxiliary resonance circuit 15 of the power converter 10.

Specifically, the anode of the diode DS is connected to the first end of the main inductor L1, and the cathode of the diode DS is connected to the first end of the auxiliary inductor L2. The second end of the auxiliary inductor L2 is connected to the drain of the switch S3, and the source of the switch S3 is connected to the second end of the main inductor L1. The driver 16c is connected to the control terminal, i.e. the gate, of the switch S3.

The direction of the inductor current IL1 flowing through the main inductor L1 in the power converter 10A is opposite to the direction of the inductor current IL1 flowing through the main inductor L1 in the power converter 10. Similarly, the direction of the auxiliary current IL2 flowing through the auxiliary circuit 15A in the power converter 10A is opposite to the direction of the auxiliary current IL2 flowing through the auxiliary circuit 15 in the power converter 10.

In addition, the functions of the switch S1 of the power converter 10A are identical to the functions of the switch S2 of the power converter 10, and the functions of the switch S2 of the power converter 10A according to the second embodiment are identical to the functions of the switch S1 of the power converter 10.

Specifically, the switch S2 serves as a main switch for power conversion, and the switch S1 serves as a synchronous rectification switch. When the switch S2 is on while the switch S1 is off, the DC power source 80a causes a current to flow to the main inductor L1 so that magnetic energy based on the current is stored in the main inductor L1. In contrast, when the switch S1 is on while the switch S2 is off, the magnetic energy stored in the main inductor L1 causes a current from the main inductor L1 to flow to the electrical load 70a connected to the terminals 11 and 12. This results in the input voltage V2 of the DC power source 80a to the power converter 10A being stepped up to a predetermined voltage. The predetermined stepped-up voltage is output from the terminals 11 and 12 to the electrical load 70a.

The power converter 10A is configured to perform the ZVS control for the second switch S2 when the drain-source voltage Vds2 is zero, i.e. the diode D2 is on.

How the gate voltage Vgs1 changes over time according to the second embodiment, which is identical to how the gate voltage Vgs2 changes over time according to the first embodiment, is illustrated in FIGS. 2B and 3B. Similarly, how the gate voltage Vgs2 changes over time according to the second embodiment, which is identical to how the gate voltage Vgs1 changes over time according to the first embodiment, is illustrated in FIGS. 2A and 3A.

How the drain-source voltage Vds1 changes over time according to the second embodiment, which is identical to how the drain-source voltage Vds2 changes over time according to the first embodiment, is illustrated in FIGS. 2E and 3E. Similarly, how the drain-source voltage Vds2 changes over time according to the second embodiment, which is identical to how the drain-source voltage Vds1 changes over time according to the first embodiment, is illustrated in FIGS. 2D and 3D.

For these reasons, the power converter 10A according to the second embodiment is configured to (1) Monitor the rising waveform of the drain-source voltage Vds1 or the falling waveform of the drain-source voltage Vds2

(2) Generate the control signal to the driver 16c for the switch S3 such that the rising waveform of the drain-source voltage Vds1 or the falling waveform of the drain-source voltage Vds2 becomes a predetermined target waveform corresponding to the optimum transient curve TC1 of the auxiliary current IL2.

In particular, when controlling the rising waveform of the drain-source voltage Vds1, the power converter 10A according to the second embodiment is configured to count, as the transition time Ta, time from turn-off timing to the switch S1 to timing at which the drain-source voltage Vds1 reaches the threshold voltage Vth; the threshold voltage Vth is for example 90% of the input voltage V2.

As another example, when controlling the falling waveform of the drain-source voltage Vds2, the power converter 10A according to the second embodiment can be configured to count, as the transition time Ta, time from turn-off timing to the switch S1 to timing at which the drain-source voltage Vds2 reaches the threshold voltage Vth; the threshold voltage Vth is for example 10% of the input voltage V2.

FIG. 17A schematically illustrates a first example of the structure of a transition-time signal obtainer 50A of the power converter 10A when the transition-time signal obtainer 50A obtains the transition-time signal indicative of the transition time Ta based on the falling waveform of the drain-source voltage Vds2.

The transition-time signal obtainer 50A includes a voltage comparator 51A and an XOR circuit 53A. The voltage comparator 51A includes resistors R5 and R6, a comparator 52A, and a DC power source 54. Each of the resistors R5 and R6 has opposing first and second ends. The comparator 52A has a non-inverting input terminal, an inverting input terminal, and an output terminal. The XOR circuit 53A has first and second input terminals and an output terminal. The output terminal of the XOR circuit 53A is connected to the controller 20. The DC power source 54 has a positive terminal and a negative terminal.

The first end of the resistor R5 is connected to the first end of the main inductor L1, and the second end of the resistor R5 is connected to the first end of the resistor R6. The second end of the resistor R6 is connected to the low-side terminal 12 of the power converter 10A.

The connection point between the second end of the resistor R5 and the first end of the resistor R6 is connected to the non-inverting input terminal of the comparator 52A. The positive terminal of the DC power source 54 is connected to the inverting input terminal of the comparator 52A. The negative input terminal of the DC power source 54 is connected to the low-side terminal 12 of the power converter 10A.

The output terminal of the comparator 52A is connected to the first input terminal of the XOR circuit 53A.

The resistors R5 and R6 enable the drain-source voltage Vds1 to be input to the non-inverting input terminal of the comparator 52. The DC power source 54 outputs the threshold voltage Vth to be input to the inverting input terminal of the comparator 52A.

The comparator 52A outputs, for example, a signal having the logical high level of 1 when the drain-source voltage Vds2 is higher than the threshold voltage Vth, which is set to 10% of the input voltage V2, after turn-off of the switch S1. In contrast, the comparator 52A outputs, for example, a signal having the logical low level of 0 when the drain-source voltage Vds2 is lower than the threshold voltage Vth.

The output of the comparator 52A is input to the first input terminal of the XOR circuit 53A, and the gate control signal G1 for the switch S1 is input to the second input terminal of the XOR circuit 53A.

The XOR circuit 53A outputs the logical high level of 1 when the output of the comparator 52A is the logical high level of 1 and the gate control signal G1 for the switch S1 is the logical low level of 0. In contrast, the XOR circuit 53A outputs the logical low level of 0 when the output of the comparator 52A is the logical low level of 0 and the gate control signal G1 for the switch S1 is the logical low level of 0.

This results in the output of the XOR circuit 53A being maintained at the logical high level of 1 within the period from turn-off instruction to the switch S1 to the timing when the drain-source voltage Vds2 reaches the threshold Vth. That is, the output of the XOR circuit 53A is switched from the logical high level of 1 to the logical low level of 0 when the drain-source voltage Vds2 becomes smaller than the threshold Vth.

That is, the period for which the output of the XOR circuit 53A is the logical high level of 1 represents the transition time Ta as the parameter indicative of the falling waveform of the drain-source voltage Vds2 according to the first example. This enables the controller 20A to measure the logical high-level duration of the output signal of the XOR circuit 53A as the transition time Ta using, for example, a known capturing function of the microcomputer installed in the microcomputer.

In addition, FIG. 17B schematically illustrates a second example of the structure of the transition-time signal obtainer 50A when the transition-time signal obtainer 50A obtains the transition-time signal indicative of the transition time Ta based on the rising waveform of the drain-source voltage Vds1.

As illustrated in FIG. 17B, the power converter 10A can be configured to count, as the transition time Ta, time from turn-off timing to the switch S1 to timing at which the drain-source voltage Vds1 reaches the threshold voltage Vth that is set to 90% of the input voltage V2.

Specifically, the voltage comparator 51A can be configured such that the drain-source voltage Vds1 is input to the non-inverting input terminal of the comparator 52A, and the threshold voltage Vth is input to the inverting input terminal of the comparator 52A. This enables the comparator 52A to output (1) A signal having the logical high level of 1 when the drain-source voltage Vds1 is equal to or higher than the threshold voltage Vth (2) A signal having the logical low level of 0 when the drain-source voltage Vds1 is lower than the threshold voltage Vth.

The output of the comparator 52A is input to the first input terminal of the XOR circuit 53A, and the gate control signal G1 for the switch S1 is input to the second input terminal of the XOR circuit 53A.

The XOR circuit 53A outputs the logical high level of 1 when the output of the comparator 52A is the logical high level of 1 and the gate control signal G1 for the switch S1 is the logical low level of 0. In contrast, the XOR circuit 53A outputs the logical low level of 0 when the output of the comparator 52A is the logical low level of 0 and the gate control signal G1 for the switch S1 is the logical low level of 0.

This results in the output of the XOR circuit 53A being maintained at the logical high level of 1 within the period from turn-off instruction to the switch S1 to the timing when the drain-source voltage Vds1 exceeds the threshold Vth. That is, the output of the XOR circuit 53A is switched from the logical high level of 1 to the logical low level of 0 when the drain-source voltage Vds1 exceeds the threshold Vth.

That is, the period for which the output of the XOR circuit 53A is the logical high level of 1 represents the transition time Ta as the parameter indicative of the rising waveform of the drain-source voltage Vds1 according to the second example. That is, the period for which the output of the XOR circuit 53A is the logical high level of 1 represents the transition time Ta. This enables the controller 20A to measure the logical high-level duration of the output signal of the XOR circuit 53A as the transition time Ta using, for example, the known capturing function of the microcomputer installed in the microcomputer.

Next, the following describes detailed functions of the controller 20A with reference to FIG. 18.

Referring to FIG. 18, the controller 20A functionally includes a first duty calculator 21A, a voltage deviation calculator 22A, a voltage controller 23A, the upper-arm corrector 24, the lower-arm corrector 25, the dead time corrector 26, the transition time calculator 27a, the time deviation calculator 27, the transition time controller 28, and the second duty calculator 29.

The following describes the functions of the first duty calculator 21A, voltage deviation calculator 22A, and voltage controller 23A of the controller 20, which are different from the functions of the respective first duty calculator 21, voltage deviation calculator 22, and voltage controller 23 of the controller 20. Descriptions of the other functional modules 24, 25, 26, 27a, 27, 28, and 29 of the controller 20A are omitted or simplified, because the other functional modules 24, 25, 26, 27a, 27, 28, and 29 of the controller 20A are identical to the respective functional modules 26, 27a, 27, 28, and 29 of the controller 20.

The first duty calculator 21A measures the input voltage V2 between the high- and low-side terminals 13 and 14, and the output voltage V1 between the high- and low-side terminals 11 and 12; the output voltage V1 is a voltage actually applied to the electrical load 70a. Then, the first duty calculator 21A calculates, based on the input voltage V2 and the output voltage V1, (1) The upper-arm duty, i.e. the upper-arm duty cycle, for each switching period of the switch S1

(2) The lower-arm duty, i.e. the lower-arm duty cycle, for each switching period of the switch S2.

The voltage deviation calculator 22A receives a predetermined target voltage Vtgt for the electrical load 70a when the predetermined target voltage Vtgt is, for example, input thereto by a user or input thereto from the host computer of the controller 20A. Then, the voltage deviation calculator 22A calculates the voltage deviation of the measured output voltage V1 from the target voltage Vtgt.

The voltage deviation of the measured output voltage V1 from the target voltage Vtgt is fed back to the voltage controller 23A.

The voltage controller 23A calculates, based on the calculated voltage deviation fed back thereto, an upper-arm correction of the calculated upper-arm duty for the switch S1 and a lower-arm correction of the calculated lower-arm duty for the switch S2 such that the output voltage V1 becomes the target voltage Vtgt. For example, the voltage controller 23A calculates (1) An upper-arm correction of the upper-arm duty for the switch S1 to reduce the on duration based on the upper-arm duty (2) A lower-arm correction of the lower-arm duty for the switch S2 to increase the on duration based on the lower-arm duty when the measured output voltage V2 is higher than the target voltage Vtgt.

The other functions of the power converter 10A are substantially identical to the corresponding functions of the power converter 10.

As described in detail above, the power converter 10A according to the second embodiment is configured to adjust the parameter indicative of the rising waveform of the drain-source voltage Vds1 or indicative of the falling waveform of the drain-source voltage Vds2 in accordance with a predetermined optimum value of the parameter. Then, the power converter 10A is configured to adjust turn-on timing of the switch S3 based on the adjusted parameter, thus enabling the ZVS control for turn-on of the switch S2 to be carried out while the auxiliary current has little or no margin.

Accordingly, the power converter 10A according to the second embodiment achieves the advantageous effects that are the same as those achieved by the power converter 10 according to the first embodiment.

Third Embodiment

Figure 19:
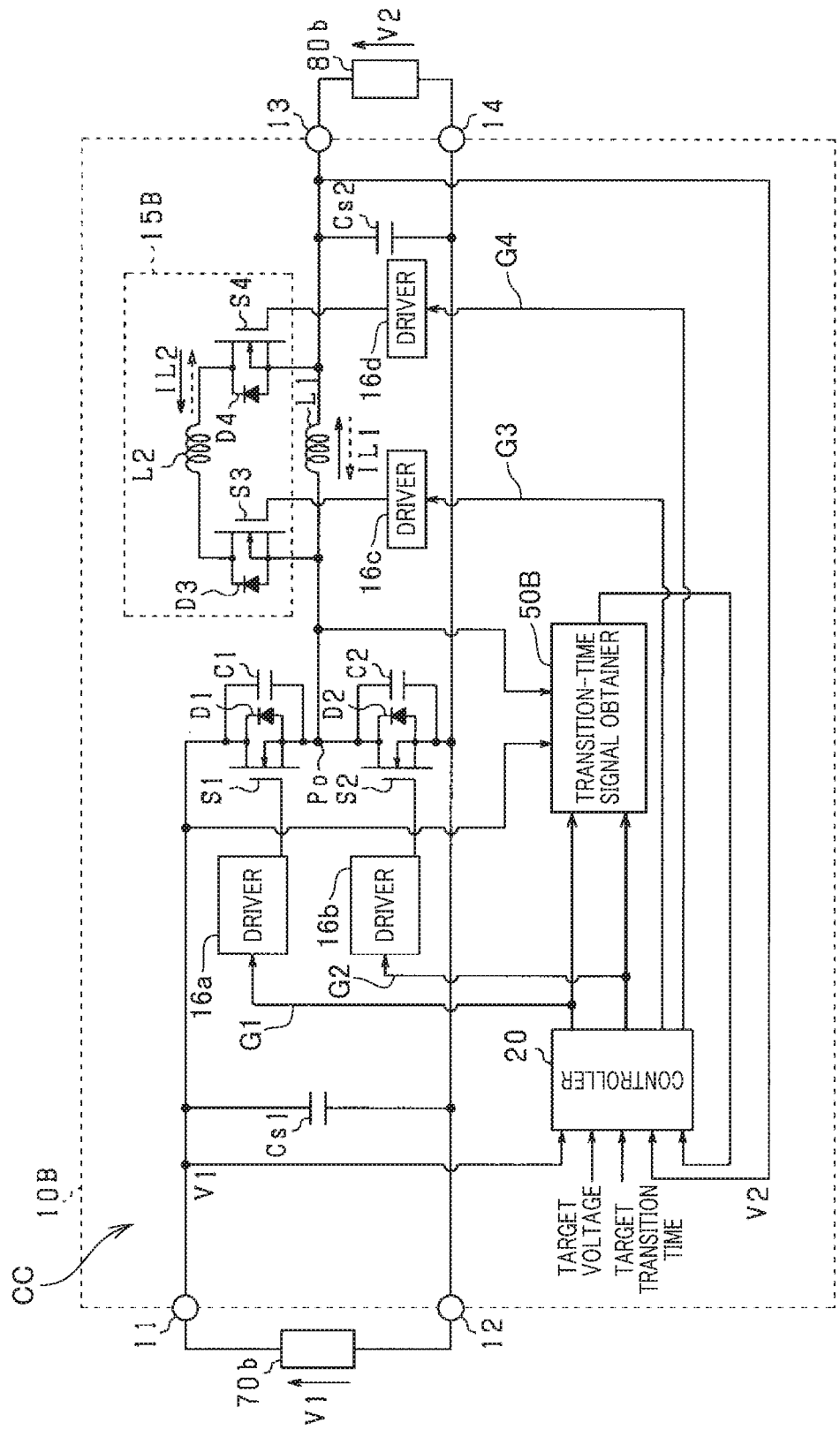
FIG. 19 is a circuit and block diagram schematically illustrating an example of the overall structure of a power converter according to the third embodiment of the present disclosure.
Figure 20:
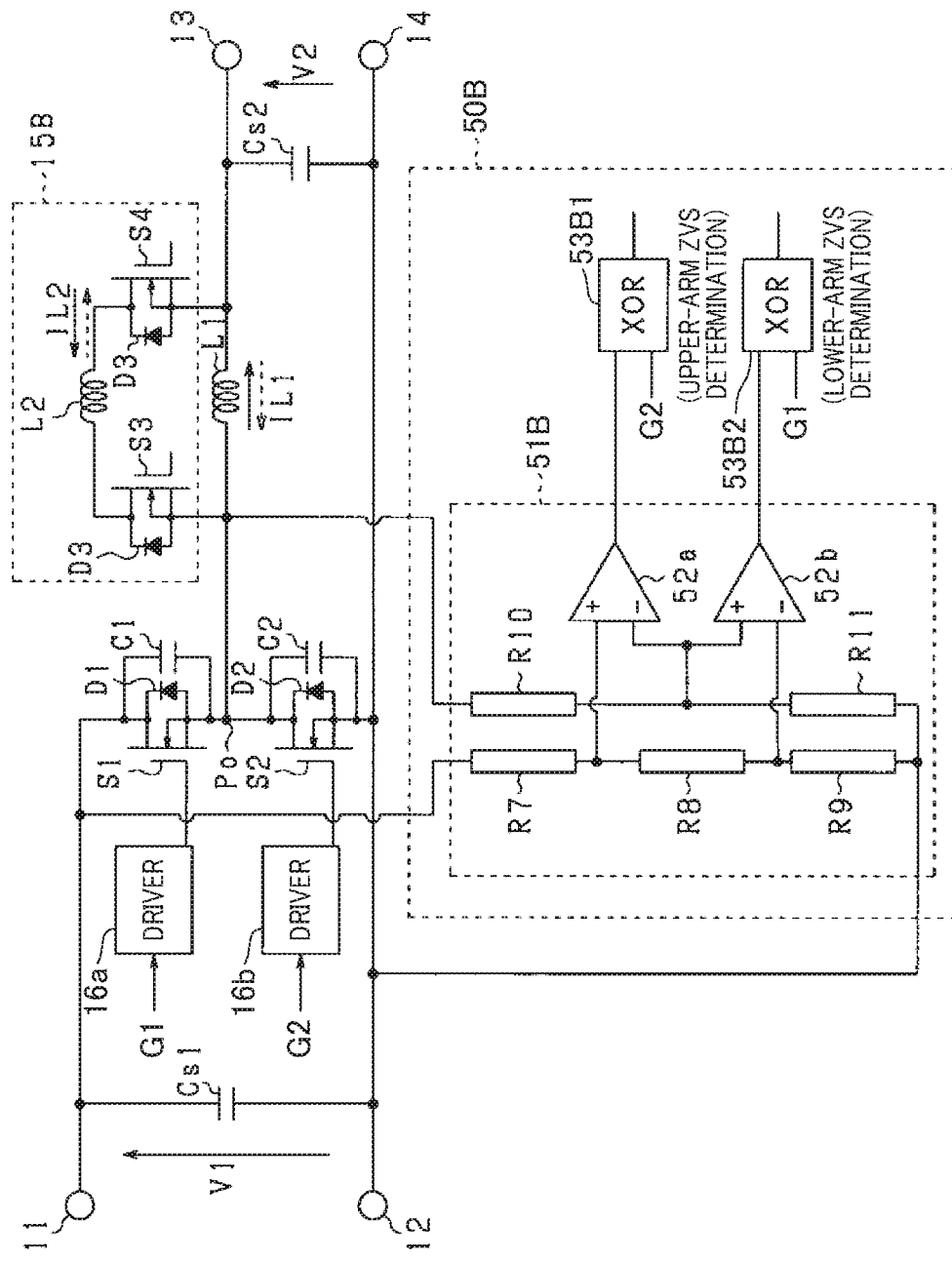
FIG. 20 is a circuit diagram schematically illustrating an example of the structure of a transition-time signal obtainer of the power converter according to the third embodiment.

The following describes a power converter 10B according to the third embodiment of the present disclosure with reference to FIGS. 19 and 20

The structure and functions of the power converter 10B according to the third embodiment are slightly different from those of the power converter 10 according to the first embodiment by the following points. So, the different points will be mainly described hereinafter.

Referring to FIG. 19, a DC power source or an electrical load 70b is connected to the high- and low-side terminals 11 and 12 of the power converter 10B, and a DC power source or an electrical load 80b is connected to the high- and low-side terminals 13 and 14 of the power converter 10B.

That is, the power converter 10B, which serves as a bidirectional voltage converter configured to (1) Step down an input voltage V1 of the DC power source 70b input to the high- and low-side terminals 11 and 12 to output the stepped-down voltage to the electrical load 80b via the high- and low-side terminals 13 and 14 as an output voltage V2

(2) Step up an input voltage V2 of the DC power source 80b input to the high- and low-side terminals 13 and 14 to output the stepped-up voltage to the electrical load 70b via the high- and low-side terminals 11 and 12 as an output voltage V1.

The power converter 10B includes an auxiliary resonance circuit 15B whose structure differs from the structure of the auxiliary resonance circuit 15 of the power converter 10.

Specifically, the auxiliary resonance circuit 15B includes switches S3 and S4, which serve as, for example, auxiliary elements, and an auxiliary inductor L2, which serves as, for example, a second magnetic component. Diodes D3 and D4 are connected across the respective switches S3 and S4 in antiparallel thereto.

The source of the switch S3 is connected to the first end of the main inductor L1, and the drain of the switch S3 is connected to the first end of the auxiliary inductor L2. The second end of the auxiliary inductor L2 is connected to the drain of the switch S4, and the source of the switch S4 is connected to the second end of the main inductor L1. The driver 16c is connected to the control terminal, i.e. the gate, of the switch S3, and a driver 16d is connected to the control terminal, i.e. the gate, of the switch S4. The driver 16d is also connected to the controller 20. The controller 20 generates a control signal, i.e. a gate control signal G4 for controlling on/off switching of the switch S4, and sends the gate control signal G4 to the driver 16d, thus controlling on/off switching of the switch S4.

When the power converter 10B operates in a step-down mode, the switch S1 serves as a main switch for power conversion, the switch S2 serves as a synchronous rectification switch, and the switch S3 serves as an auxiliary switch used to the ZVS control as described in the first embodiment.

On the other hand, when the power converter 10B operates in a step-up mode, the switch S2 serves as a main switch for power conversion, the switch S1 serves as a synchronous rectification switch, and the switch S4 serves as an auxiliary switch used to the ZVS control as described in the second embodiment.

That is, the power converter 10B selects one of the step-down mode and the step-up mode to perform the corresponding one of the input-voltage reduction operation and the input-voltage boosting operation.

FIG. 20 schematically illustrates an example of the structure of a transition-time signal obtainer 50B of the power converter 10B.

The transition-time signal obtainer 50B includes a voltage comparator 51B, and XOR circuits 53B1 and 53B2. The voltage comparator 51B includes resistors R7 to R11, a comparator 52B1, and a comparator 52B2.

Each of the resistors R7 to R11 has opposing first and second ends. Each of the comparators 52B1 and 52B2 has a non-inverting input terminal, an inverting input terminal, and an output terminal. Each of the XOR circuits 53B1 and 53B2 has first and second input terminals and an output terminal. The output terminal of each of the XOR circuits 53B1 and 53B2 is connected to the controller 20.

The first end of the resistor R7 is connected to the high-side terminal 11 of the power converter 10B, and the second end of the resistor R7 is connected to the first end of the resistor R8. The second end of the resistor R8 is connected to the first end of the resistor R9. The second end of the resistor R9 is connected to the low-side terminal 12 of the power converter 10B.

The first end of the resistor R10 is connected to the first end of the main inductor L1, and the second end of the resistor R10 is connected to the first end of the resistor R11. The second end of the resistor R11 is connected to the low-side terminal 12 of the power converter 10.

The connection point between the second end of the resistor R7 and the first end of the resistor R8 is connected to the non-inverting input terminal of the comparator 52B1. The connection point between the second end of the resistor R8 and the first end of the resistor R9 is connected to the inverting input terminal of the comparator 52B2.

The connection point between the second end of the resistor R10 and the first end of the resistor R11 is connected to both the inverting input terminal of the comparator 52B1 and the non-inverting input terminal of the comparator 52B2.

The output terminal of the comparator 52B1 is connected to the first input terminal of the XOR circuit 53B1, and the output terminal of the comparator 52B2 is connected to the first input terminal of the XOR circuit 53B2. The gate control signal G2 is input to the second input terminal of the XOR circuit 53B1, and the gate control signal G1 is input to the second input terminal of the XOR circuit 53B2.

The resistors R7 to R9 serve as a first voltage divider to divide the input voltage V1 into a divided voltage defined by $(R8a+R9a)/(R7a+R8a+R9a)$ where $R7a$ represents the resistance of the resistor R7, $R8a$ represents the resistance of the resistor R8, and $R9a$ represents the resistance of the resistor R9. The divided voltage serves as the threshold voltage Vth so as to be input to the non-inverting input terminal of the comparator 52B1. Adjustment of the resistances of the resistors R10 and R11 enables the drain-source voltage Vds2 to be input to the inverting input terminal of the comparator 52B1 and to the non-inverting input terminal of the comparator 52B2.

The resistors R7 to R9 also serve as a second voltage divider to divide the input voltage V1 into a divided voltage defined by $R9a/(R7a+R8a+R9a)$. The divided voltage serves as the threshold voltage Vth so as to be input to the inverting input terminal of the comparator 52B2.

When the power converter 10B is operating in the step-down mode, the comparator 52B1 and the XOR circuit 53B1 operate in the same manner as the comparator 52 and the XOR circuit 53 according to the first embodiment. This enables the output of the XOR circuit 53B1 being maintained at the logical high level of 1 within the period from turn-off instruction to the switch S2 to the timing when the drain-source voltage Vds2 reaches the threshold Vth. That is, the output of the XOR circuit 53B is switched from the logical high level of 1 to the logical low level of 0 when the drain-source voltage Vds2 exceeds the threshold Vth.

That is, the period for which the output of the XOR circuit 53B1 is the logical high level of 1 represents the transition time Ta as the parameter indicative of the rising waveform of the drain-source voltage Vds2. This enables the controller 20 to measure the logical high-level duration of the output signal of the XOR circuit 53B1 as the transition time Ta.

In addition, when the power converter 10B is operating in the step-up mode, the comparator 52B2 and the XOR circuit 53B2 operate in the same manner as the comparator 52A and the XOR circuit 53A according to the second embodiment.

This enables the output of the XOR circuit 53B2 to be maintained at the logical high level of 1 within the period from turn-off instruction to the switch S1 to the timing when the drain-source voltage Vds2 becomes lower than the threshold Vth. That is, the output of the XOR circuit 53B2 is switched from the logical high level of 1 to the logical low level of 0 when the drain-source voltage Vds2 becomes lower than the threshold Vth.

That is, the period for which the output of the XOR circuit 53B2 is the logical high level of 1 represents the transition time Ta as the parameter indicative of the falling waveform of the drain-source voltage Vds2. This enables the controller 20 to measure the logical high-level duration of the output signal of the XOR circuit 53B2 as the transition time Ta.

As described above, the power converter 10B according to the third embodiment enables the ZVS control for turn-on of the switch S1 and the ZVS control for turn-on of the switch S2 to be both carried out while the auxiliary current has little or no margin. Accordingly, the power converter 10B according to the third embodiment achieves the advantageous effects that are the same as those achieved by the power converters 10 and 10A according to the first and second embodiments.

Fourth Embodiment

Figure 21:
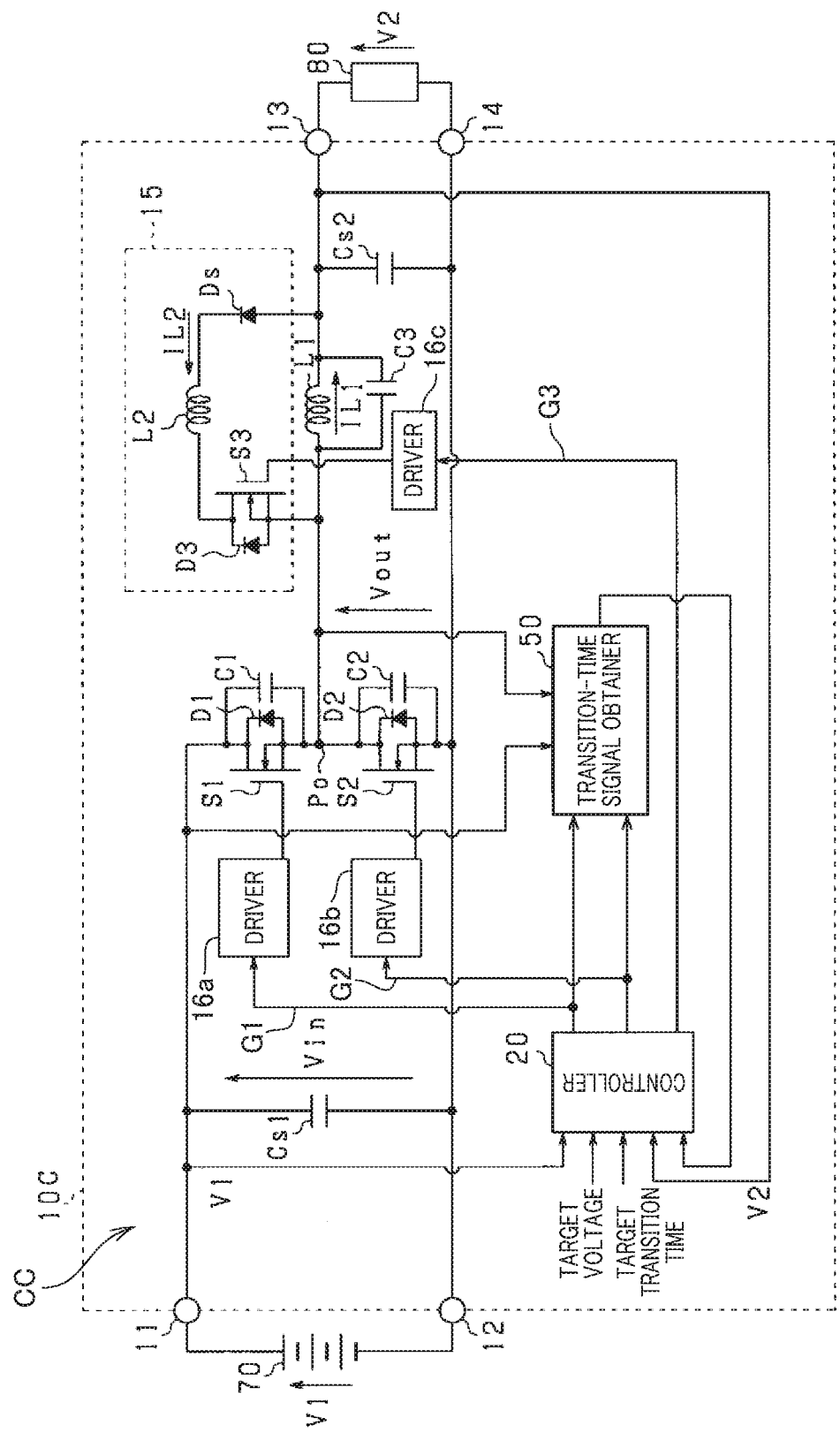
FIG. 21 is a circuit and block diagram schematically illustrating an example of the overall structure of a power converter according to the fourth embodiment of the present disclosure.

The following describes a power converter 10C according to the fourth embodiment of the present disclosure with reference to FIG. 21.

The structure and functions of the power converter 10C according to the fourth embodiment are slightly different from those of the power converter 10 according to the first embodiment by the following points. So, the different points will be mainly described hereinafter.

Referring to FIG. 21, the power converter 10C further includes a capacitor C3 connected to the first and second ends of the main inductor L1 in parallel to the main inductor L1.

Because the capacitor C3 cooperate with the capacitors C1 and C2 and the auxiliary inductor L2 to generate resonance thereamong, the power converter 10C achieves, in addition to the same advantageous effects as the power converter 1 according to the first embodiment, the following further advantageous effect. Specifically, the configuration of the power converter 10C enables the capacitances C1$a$ and C2$a$ of the respective capacitors C1 and C2 to be reduced. This enables the power converter 10C to use lower-voltage, smaller-sized capacitors as the capacitors C1 and C2. Each of the power converters 10, 10A, and 10B can include a capacitor C3 connected to the first and second ends of the main inductor L1 in parallel to the main inductor L1.

Fifth Embodiment

Figure 22:
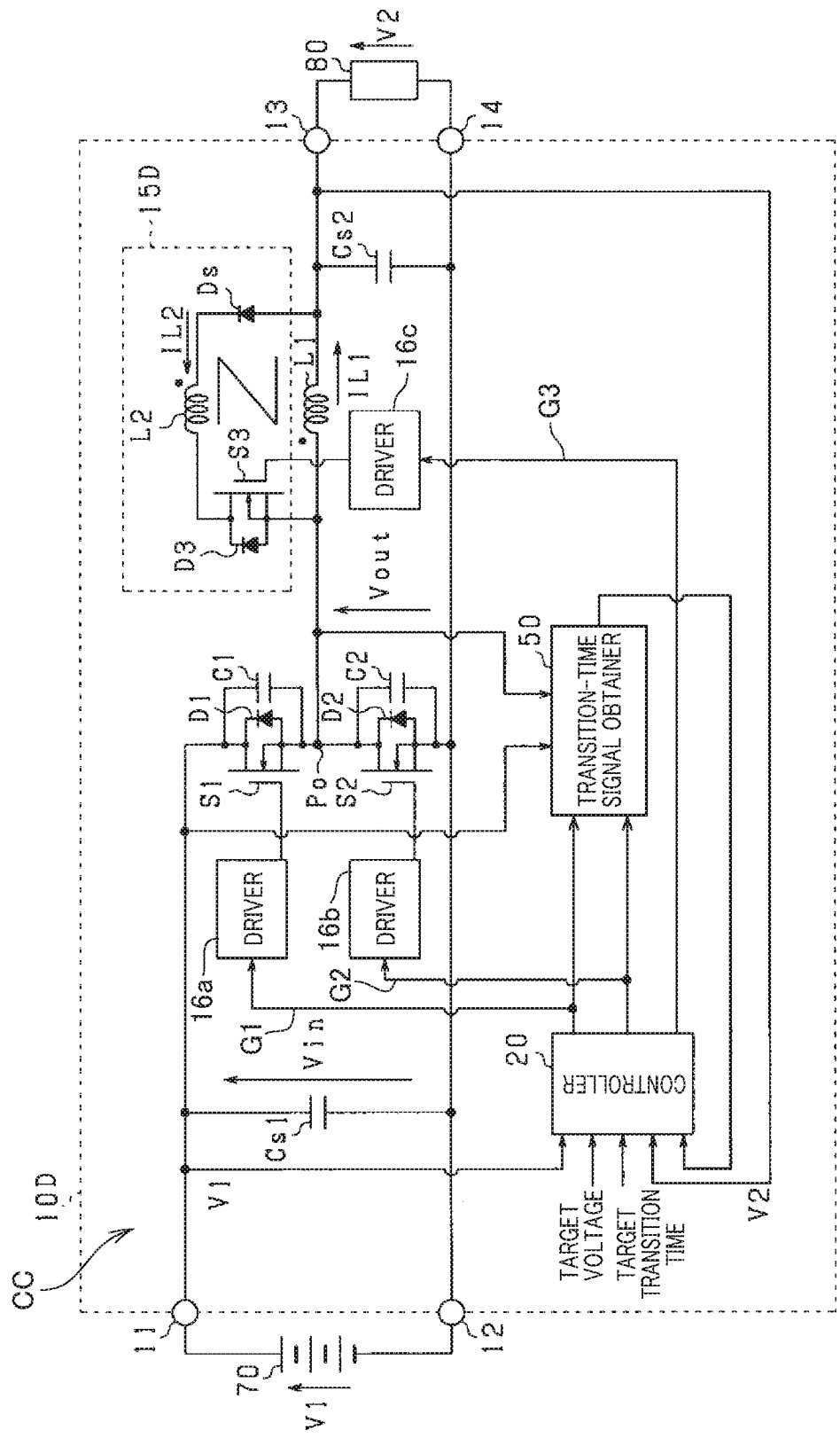
FIG. 22 is a circuit and block diagram schematically illustrating an example of the overall structure of a power converter according to the fifth embodiment of the present disclosure.

The following describes a power converter 10D according to the fifth embodiment of the present disclosure with reference to FIG. 22.

The structure and functions of the power converter 10D according to the fifth embodiment are slightly different from those of the power converter 10 according to the first embodiment by the following points. So, the different points will be mainly described hereinafter.

Referring to FIG. 22, the power converter 10D includes an auxiliary resonance circuit 15D whose structure differs from the structure of the auxiliary resonance circuit 15 of the power converter 10.

Specifically, as illustrated in FIG. 22, the power converter 10D is configured such that the main inductor L1 and the auxiliary inductor L2 are magnetically coupled to each other while they are electrically separated from each other. This configuration enables the main inductor L1 and the auxiliary inductor L2 to have a common core and primary and secondary coils are wound around the common core, so that the main inductor L1 and the auxiliary inductor L2 are produced. That is, the main inductor L1 is comprised of the primary coil having the number of turns, referred to N1, and an excitation inductance connected in parallel to each other. The auxiliary inductor L2 is comprised of the secondary coil having the number of turns, referred to N2, and a leakage inductance connected in series to each other. The primary coil and the secondary coil constitute an ideal transformer, and the leakage inductance is sufficiently smaller than the excitation inductance. This results in the leakage inductance and the capacitors C1 and C2 resonating with each other. For this reason, the inductance L in the above equation (3) represents the value of the leakage inductance.

In addition, the polarity of the first end of the main inductor L1 and the polarity of the second end of the auxiliary inductor L2 are set to be identical to each other. This enables a voltage applied across the leakage inductance to increase by the product of a voltage across the excitation inductance and the turn ratio (N2/N1) of the transformer as compared with the voltage across the excitation inductance. This enables the time required to store magnetic energy in the leakage inductance to be shorter than the case where the polarity of the first end of the main inductor L1 differs from the polarity of the second end of the auxiliary inductor L2.

As described above, the power converter 10D according to the fifth embodiment achieves, in addition to the same advantageous effects as the power converter 10 according to the first embodiment, the following further advantageous effects.

Specifically, the power converter 10D enables the main inductor L1 and the auxiliary inductor L2 to have a common core, resulting in downsize of the power converter 10D.

The power converter 10D is configured such that the polarity of the second end of the auxiliary inductor L2 are set to be identical to each other. This configuration enables the voltage across the leakage inductance to increase while the switch S3 is on, resulting in time required for magnetic energy to be stored in the leakage inductance being shorter than the case where the polarity of the second end of the auxiliary inductor L2 are set to differ from each other.

Sixth Embodiment

Figure 23:
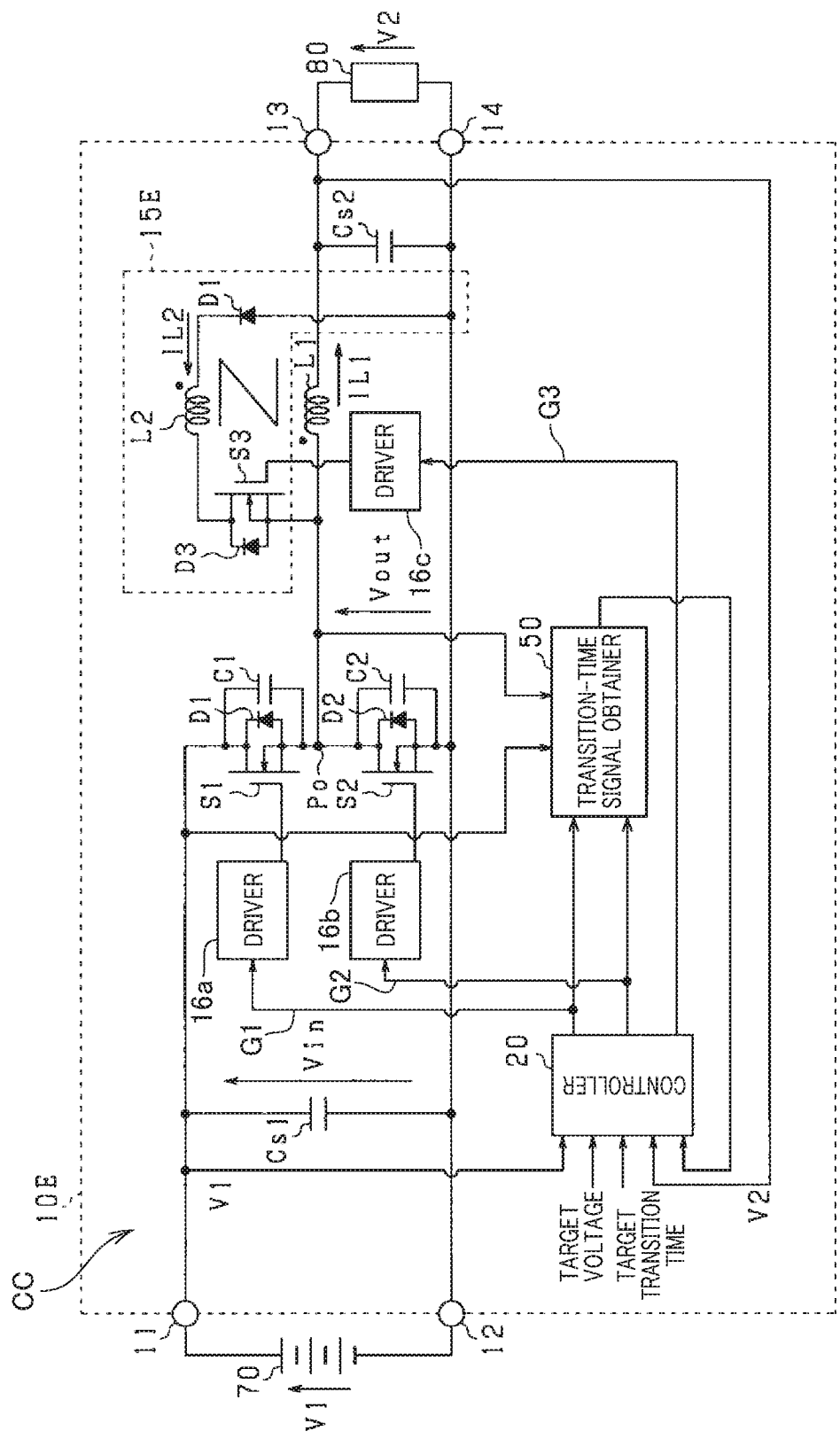
FIG. 23 is a circuit and block diagram schematically illustrating an example of the overall structure of a power converter according to the sixth embodiment of the present disclosure.

The following describes a power converter 10E according to the sixth embodiment of the present disclosure with reference to FIG. 23.

The structure and functions of the power converter 10E according to the sixth embodiment are slightly different from those of the power converter 10D according to the fifth embodiment by the following points. So, the different points will be mainly described hereinafter.

Referring to FIG. 23, the power converter 10E includes an auxiliary resonance circuit 15E whose structure differs from the structure of the auxiliary resonance circuit 15D of the power converter 10D.

Specifically, as illustrated in FIG. 23, the power converter 10E includes a diode DE in place of the diode DS. The anode of the diode DE is connected to a common signal ground of the power converter 10E between the terminals 12 and 14. That is, the potential of the common signal ground is the same as the potential of each of the low-side terminals 12 and 14 and the source of the switch S2. For example, the first end of the main inductor L1 and the second end of the auxiliary inductor L2 are magnetically coupled to each other while the polarity of the first end of the main inductor L1 and the polarity of the second end of the auxiliary inductor L2 are identical to each other. This enables the anode of the diode DE to be connected to the common signal ground.

The power converter 10D according to the fifth embodiment as illustrated in FIG. 22 is configured such that the potential at the anode of the diode D3 connected in antiparallel to the switch S3 is higher than the potential at the cathode of the diode D3 while the switch S1 is on. This enables the diode D3 to be on, i.e. a current to flow through the diode D3, so that the drain-source voltage Vds3 of the switch S3 becomes zero. Thereafter, the drain-source voltage Vds3 of the switch S3 is represented as the sum of the output voltage V2 and the drain-source voltage Vds2 while the switch S2 is on.

In contrast, the power converter 10E according to the sixth embodiment is configured such that, like the power converter 10D, the diode D3 is on while the switch S1 is on, so that the drain-source voltage Vds3 of the switch S3 becomes zero. Thereafter, the drain-source voltage Vds3 of the switch S3 is the drain-source voltage Vds2 while the switch S2 is on. This enables the drain-source voltage Vds3 of the switch S3 to be lower by the output voltage V2 as compared to the drain-source voltage Vds3 of the switch S3 according to the power converter 10D.

This configuration of the power converter 10E achieves, in addition to the same advantageous effects as the power converter 10D according to the fifth embodiment, an advantageous effect that enables a lower-voltage switch to be used as the switch S3, resulting in downsizing of the power converter 10E.

Seventh Embodiment

Figure 24:
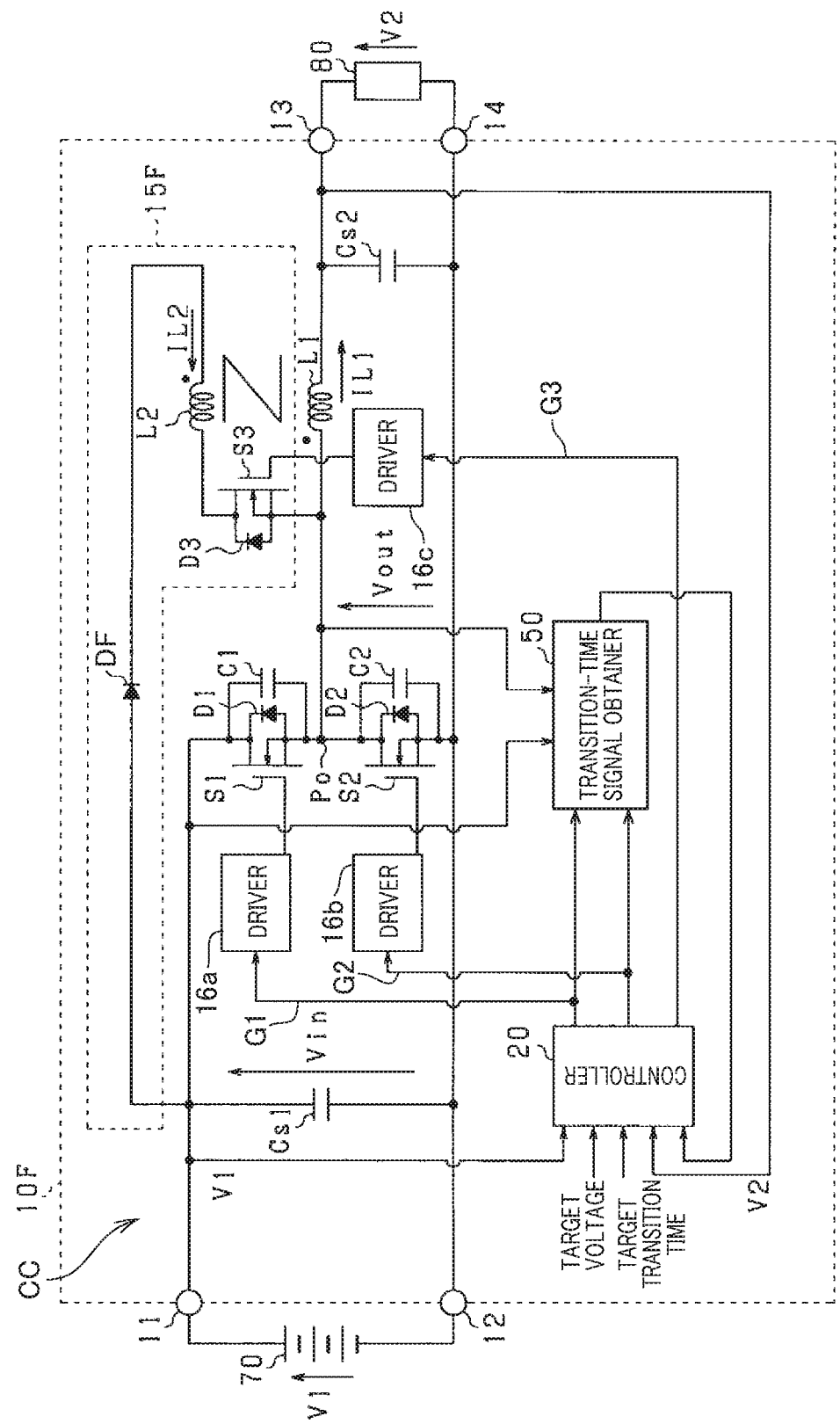
FIG. 24 is a circuit and block diagram schematically illustrating an example of the overall structure of a power converter according to the seventh embodiment of the present disclosure.

The following describes a power converter 10F according to the seventh embodiment of the present disclosure with reference to FIG. 24.

The structure and functions of the power converter 10F according to the seventh embodiment are slightly different from those of the power converter 10D according to the fifth embodiment by the following points. So, the different points will be mainly described hereinafter.

Referring to FIG. 24, the power converter 10F includes an auxiliary resonance circuit 15F whose structure differs from the structure of the auxiliary resonance circuit 15D of the power converter 10D.

Specifically, as illustrated in FIG. 24, the power converter 10F includes a diode DF in place of the diode DS. The anode of the diode DF is connected to the positive side of the DC power source 70. That is, the anode of the diode DF is connected to the high-side terminal 11 of the DC power source 70 and the drain of the switch S1.

This configuration of the power converter 10F achieves, in addition to the same advantageous effects as the power converter 10D according to the fifth embodiment, an advantageous effect that enables the voltage across the diode DF to be lower as compared with the configuration of the power converter 10D. This enables a lower-voltage diode to be used as the diode DF.

Eighth Embodiment

The following describes a power converter 10G according to the eighth embodiment of the present disclosure with reference to FIGS. 25 to 27B.

The structure and functions of the power converter 10G according to the eighth embodiment are slightly different from those of the power converter 10D according to the fifth embodiment by the following points. So, the different points will be mainly described hereinafter.

Figure 25:
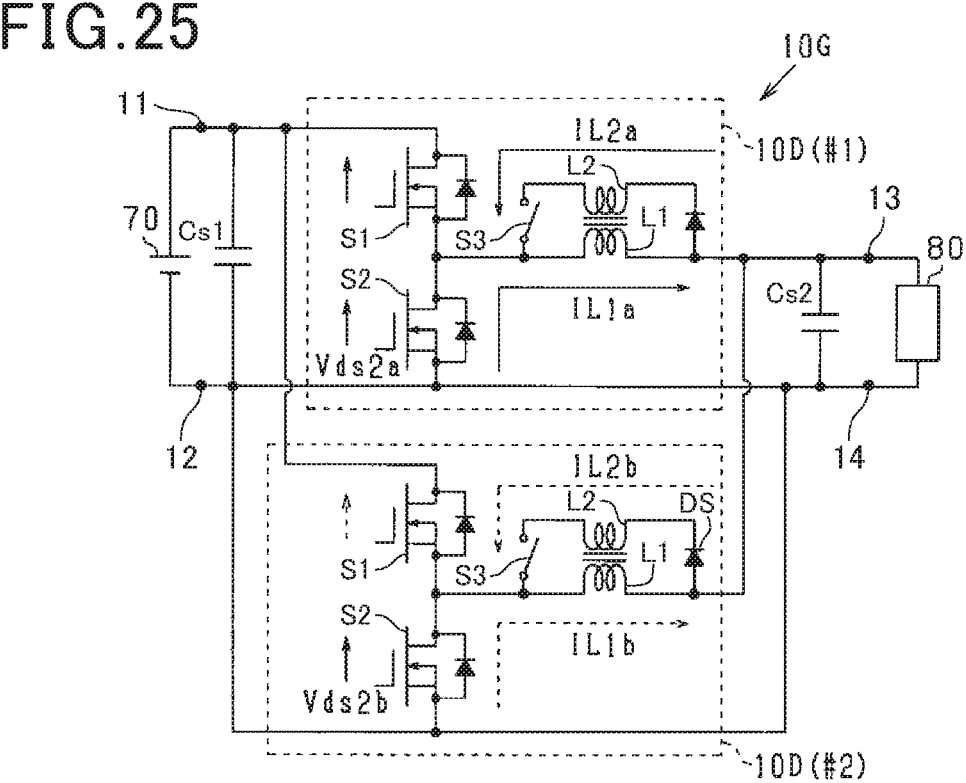
FIG. 25 is a circuit and block diagram schematically illustrating an example of the overall structure of a power converter according to the eighth embodiment of the present disclosure.

Referring to FIG. 25, the power converter 10G includes a first power converter unit 10D(#1) whose configuration is identical to the configuration of the power converter 10D, and a second power converter unit 10D(#2) whose configuration is identical to the configuration of the power converter 10D. The first power converter unit 10D(#1) and the second power converter unit 10D(#2) are connected in parallel to each other and connected between the smoothing capacitor Cs1 and the smoothing capacitor Cs2, i.e. between the terminals 11 and 12 and the terminals 13 and 14.

The controller 20, which is controllably connected to the switches S1 to S3 of the first power converter unit 10D(#1) and the switches S1 to S3 of the second power converter unit 10D(#2).

The controller 20 is configured to perform on/off switching of the switches S1 to S3 of the first power converter unit 10D(#1) to perform the ZVS control, and on/off switching of the switches S1 to S3 of the second power converter unit 10D(#2) to perform the ZVS control. Specifically, the controller 20 is configured such that the on/off switching timings of the on/off switching of the switches S1 to S3 of the first power converter unit 10D(#1) are synchronized with the respective on/off switching timings of the on/off switching of the switches S1 to S3 of the second power converter unit 10D(#2).

Simultaneously performing the ZVS control of the first power converter unit 10D(#1) and the ZVS control of the second power converter unit 10D(#2) results in time, for which a voltage is applied across the main inductor L1 of the first power converter unit 10D(#1), differing from time, for which a voltage is applied across the main inductor L1 of the second power converter unit 10D(#2). This results from the variations in the inductor currents IL1a and IL1b flowing through the main inductors L1 of the respective first and second power converter units 10D(#1) and 10D(#2).

However, the above time difference between the first and second power converter units 10D(#1) and 10D(#2) results in negative feedback that enables the inductor currents IL1a and IL1b to be simultaneously balanced with each other.

Figure 26A:
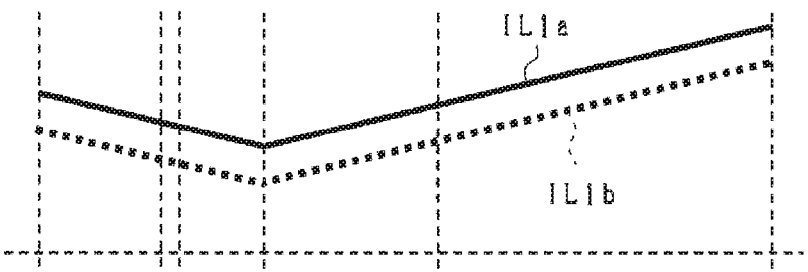
FIG. 26A is a timing chart schematically illustrating how inductor currents IL1$a$ and IL1$b$ flowing through the main inductors of respective first and second power converter units change over time during execution of simultaneous ZVS control.

FIG. 26A schematically illustrates how the inductor currents IL1a and IL1b flowing through the main inductors L1 of the respective first and second power converter units 10D(#1) and 10D(#2) change over time during the simultaneous ZVS control carried out by the respective first and second power converter units 10D(#1) and 10D(#2).

Figure 26B:
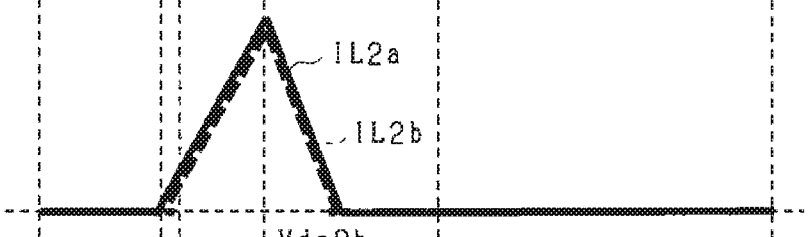
FIG. 26B is a timing chart schematically illustrating how auxiliary currents flowing through the auxiliary inductors of the respective first and second power converter units change over time during execution of the simultaneous ZVS control.

FIG. 26B schematically illustrates how auxiliary currents IL2a and IL2b flowing through the auxiliary inductors L2 of the respective first and second power converter units 10D(#1) and 10D(#2) change over time during the simultaneous ZVS control carried out by the respective first and second power converter units 10D(#1) and 10D(#2).

Figure 26C:
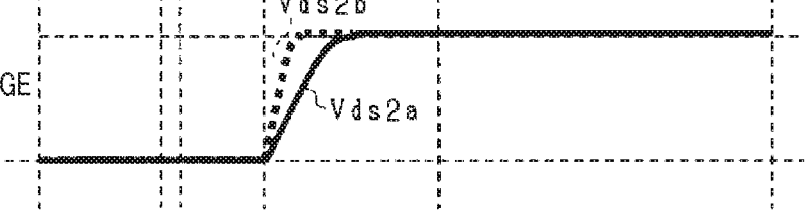
FIG. 26C is a timing chart schematically illustrating how drain-source voltages across the synchronous rectification switches of the respective first and second power converter units change over time during execution of the simultaneous ZVS control.

FIG. 26C schematically illustrates how drain-source voltages Vds2a and Vds2b across the switches S2 of the respective first and second power converter units 10D(#1) and 10D(#2) change over time during the simultaneous ZVS control carried out by the respective first and second power converter units 10D(#1) and 10D(#2).

FIG. 26A illustrates an example where the inductor current IL1a is higher than the inductor currents IL1b. In this example, the waveform of the auxiliary current IL2b becomes excessive as compared to the optimum waveform of the auxiliary current IL2b if the auxiliary current IL2a is optimum.

Although the optimum waveform of the auxiliary current IL2b is lower than the optimum waveform of the auxiliary current IL2a, because the inductor currents IL1b is lower than the inductor currents IL1a, the auxiliary current IL2a and the auxiliary current IL2b are identical to each other (see FIG. 26B).

This results in the waveform of the auxiliary current IL2b becoming excessive as compared to the optimum waveform of the auxiliary current IL2b. This results in the drain-source voltage Vds2b rising more sharply than the drain-source voltage Vds2a does, resulting in a voltage being applied to the main inductor L1 of the second power converter unit 10D(#2) earlier than a voltage being applied to the main inductor L1 of the first power converter unit 10D(#1). This therefore increases the inductor current IL1b so as to be balanced with the inductor current IL1a.

In contrast, in this example, the waveform of the auxiliary current IL2a becomes smaller as compared to the optimum waveform of the auxiliary current IL2a if the auxiliary current IL2b is optimum.

This results in the waveform of the auxiliary current IL2a becoming smaller as compared to the optimum waveform of the auxiliary current IL2a. This results in the drain-source voltage Vds2a rising more gradually than the drain-source voltage Vds2b does, resulting in a voltage being applied to the main inductor L1 of the first power converter unit 10D(#1) later than a voltage being applied to the main inductor L1 of the second power converter unit 10D(#2).

This therefore reduces the inductor current IL1a so as to be balanced with the inductor current IL1b.

Figure 27A:
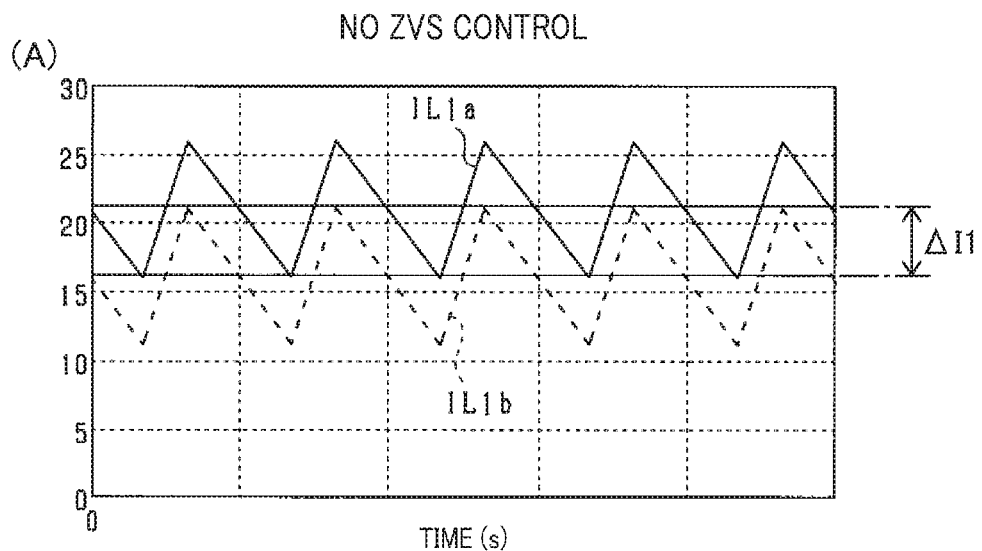
FIG. 27A is a graph schematically illustrating how the inductor currents change over time obtained by the respective first and second converter units, which carry out no ZVS control when there is a predetermined voltage difference between the output voltages of the first and second converter units.

FIG. 27A schematically illustrates how the inductor currents IL1a and IL1b change over time obtained by the respective first and second converter units 10D(#1) and 10(#2), which carry out no ZVS control when there is a voltage difference of 0.048 V between the output voltages V2 of the first and second converter units 10D(#1) and 10(#2).

Figure 27B:
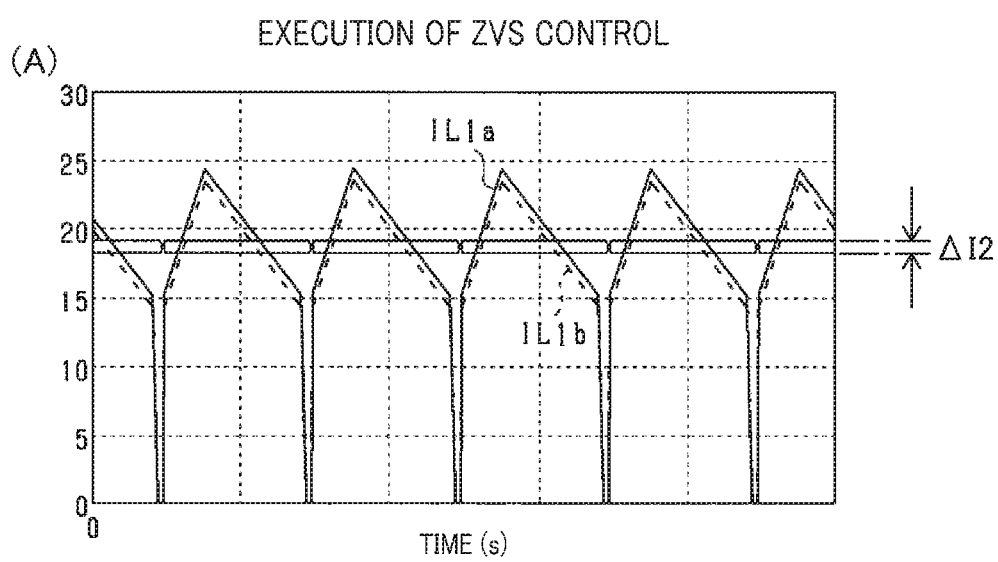
FIG. 27B is a graph schematically illustrating how the inductor currents change over time obtained by the respective first and second converter units, which carry out the ZVS control when there is the same predetermined voltage difference between the output voltages of the first and second converter units.

In contrast, FIG. 27B schematically illustrates how the inductor currents IL1a and IL1b change over time obtained by the respective first and second converter units 10D(#1) and 10(#2), which carry out the ZVS control when there is a voltage difference of 0.048 V between the output voltages V2 of the first and second converter units 10D(#1) and 10(#2).

FIG. 27A clearly shows that the variation ΔI1 of 5 A remains between the inductor currents IL1a and IL1b when the first and second converter units 10D(#1) and 10(#2) carry out no ZVS control.

In contrast, FIG. 27B clearly shows that the variation ΔI2 between the inductor currents IL1a and IL1b when the first and second power converter units 10D(#1) and 10D(#2) carry out the ZVS control is sufficiently limited to be equal or lower than 1 A.

This configuration of the power converter 10G achieves, in addition to the same advantageous effects as the power converter 10D according to the fifth embodiment, an advantageous effect that enables the inductor currents flowing through the main inductors L1 of the respective first and second power converter units 10D(#1) and 10D(#2) to be automatically balanced with each other. This results in the output currents output from the respective first and second power converter units 10D(#1) and 10D(#2) to be also automatically balanced with each other. The structure of the power converter 10G can be applied to each of the step-up converter 10A and the bidirectional converter 10B.

The present disclosure is not limited to the descriptions of the first to eighth embodiments, and the descriptions of the first to eighth embodiments can be widely modified and/or freely combined with each other within the scope of the present disclosure.

Each of the power converters 10 to 10G can be configured to (1) Detect, as a parameter indicative of one of the rising waveform of the drain-source voltage Vds2 and the falling waveform of the drain-source voltage Vds1, the slope of one of the rising waveform of the drain-source voltage Vds2 and the falling waveform of the drain-source voltage Vds1

(2) Adjust turn-on timing of the switch S3 and/or switch S4 as a function of the detected slope of one of the rising waveform of the drain-source voltage Vds2 and the falling waveform of the drain-source voltage Vds1.

Each of the power converters 10 to 10G can be configured to count time from turn-off timing to the switch S2 to timing at which the drain-source voltage Vds2 reaches half of the threshold voltage Vth, and double the counted time, thus calculating the transition time Ta.

Each of the power converters 10 to 10G can be configured to use insulated gate bipolar transistors (IGBTs) or bipolar transistors as the switches S1 to S4.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

The invention claimed is:

1. A power converter comprising:
a switching circuit comprising a main switch with a first capacitance, a synchronous rectification switch with a second capacitance, and a first magnetic component, the switching circuit being configured to convert an input voltage to a predetermined output voltage according to complementary switching of the main switch and the synchronous rectification switch;
an auxiliary switching circuit comprising an auxiliary switch and a second magnetic component with an inductance,
the auxiliary switching circuit being configured such that switch-off of the synchronous rectification switch while the auxiliary switch is on causes the first capacitance of the main switch and the second capacitance of the synchronous rectification switch to resonate with the inductance of the second magnetic component;
a parameter obtainer configured to:
detect a voltage across a selected one of the main switch and the synchronous rectification switch; and
obtain a parameter indicative of a corresponding one of rising and falling waveforms of the voltage across the selected switch while the selected switch is switched; and
a controller configured to:
output a switching control signal to each of the main switch, the synchronous rectification switch, and the auxiliary switch to control switching of the corresponding one of the main switch, the synchronous rectification switch, and the auxiliary switch;
perform a comparison of the parameter indicative of the corresponding one of rising and falling waveforms of the voltage across the selected switch with a target parameter indicative of a corresponding one of target rising and falling waveforms; and
control, as a function of a result of the comparison, the switching control signal for the auxiliary switch to adjust switch-on timing of the auxiliary switch.

2. The power converter according to claim 1, wherein:
the main switch has the first capacitance connected in parallel thereto;
the synchronous rectification switch is connected in series to the main switch to form a series switch unit, and has the second capacitance connected in parallel thereto;
the first magnetic component comprises a main inductor that has opposing first and second ends, the first end being connected to a connection point between the main switch and the synchronous rectification switch; and
the auxiliary switching circuit is connected to the first end of the first magnetic component, and further comprises an auxiliary rectification element,
the second magnetic component comprising an auxiliary inductor having the inductance.

3. The power converter according to claim 2, wherein:
the switching circuit is configured such that:
the series switch unit has opposing high- and low-side terminals,
a first current is supplied from a power source to the main inductor when the main switch is on, and a second current is supplied from the main inductor to an electrical load;
the power converter further comprises:
a first smoothing capacitor connected between the high- and low-side terminals of the series switch unit, and
a second smoothing capacitor connected across the second end of the main inductor and the low-side terminal of the series switch circuit;
the parameter obtainer comprises a transition-time signal obtainer configured to:
perform a comparison of the voltage across the selected switch with a predetermined threshold voltage, and
obtain, based on a result of the comparison and the switching control signal to the selected switch, a transition-time signal indicative of transition time,
the transition time representing one of:
a first period from a start of rising of the voltage across the synchronous rectification switch up to a predetermined first level when the selected switch is the synchronous rectification switch, and
a second period from a start of falling of the voltage across the main switch down to a predetermined second level when the selected switch is the main switch; and
the controller is configured to:
generate the switching control signals to the respective main switch and synchronous rectification switch based on the input voltage supplied from the power source, a target voltage or a target current for the electrical load, and the predetermined output voltage or an output current to the electrical load; and
generate the switching control signal to the auxiliary switch as a function of:
the transition time based on the transition time signal, and
predetermined target transition time for the transition time.

4. The power converter according to claim 3, wherein:
the controller is configured to:
calculate a voltage deviation between the target voltage and an actual output voltage or a current deviation between the target current and an actual output current,
generate the switching control signals for the respective main switch and the synchronous rectification switch such that the actual output voltage matches with the target voltage or the actual output current matches with the target current,
calculate a time deviation between the predetermined target transition time and the transition time, and
generate the switching control signal for the auxiliary switch such that the transition time matches with the predetermined target transition time.

5. The power converter according to claim 3, wherein, when loss of the power converter changes while the transition time varies, the controller is configured to determine a value of the predetermined target transition time such that a change amount of the loss of the power converter within a predetermined range of the transition time is lower than a predetermined amount,
the determined value of the predetermined target transition time being within the predetermined range of the transition time.

6. The power converter according to claim 5, wherein the predetermined range of the transition time is defined from an eighth part of a resonance period to four-thirteenths of the resonance period inclusive, the resonance period being defined based on:
the inductance of the auxiliary inductor,
the first capacitance connected in parallel to the main switch, and
the second capacitance connected in parallel to the synchronous rectification switch.

7. The power converter according to claim 3, wherein the controller is configured to determine a fourth part of a resonance period as the predetermined target transition time, the resonance period being defined based on:
the inductance of the auxiliary inductor,
the first capacitance connected in parallel to the main switch, and
the second capacitance connected in parallel to the synchronous rectification switch.

8. The power converter according to claim 2, wherein the series switch unit comprised of the main switch and the synchronous rectification switch connected in series to each other, the first magnetic component, and the auxiliary switching circuit constitute a step-down converter for stepping down the input voltage to obtain the predetermined output voltage.

9. The power converter according to claim 2, wherein the series switch unit comprised of the main switch and the synchronous rectification switch connected in series to each other, the first magnetic component, and the auxiliary switching circuit constitute a step-up converter for stepping up the input voltage to obtain the predetermined output voltage.

10. The power converter according to claim 1, further comprising:
a capacitor connected between first and second ends of the first magnetic component in parallel to the auxiliary switching circuit.

11. The power converter according to claim 1, wherein:
the first magnetic component is a main inductor,
the second magnetic component is an auxiliary inductor, and
the main inductor and the auxiliary inductor are magnetically coupled to each other.

12. The power converter according to claim 1, wherein:
the auxiliary switching circuit includes a diode having an anode and a cathode, and
the anode of the diode is connected to a ground electrode of the power converter.

13. The power converter according to claim 1, further comprising a high-side terminal and a low-side terminal such that the input voltage is applied from a power source to the power converter via the high-side terminal and the low-side terminal,
wherein:
the auxiliary switching circuit includes a diode having an anode and a cathode, and
the anode of the diode is connected to the high-side terminal of the power converter.

14. The power converter according to claim 1, wherein the auxiliary switch comprises a first auxiliary switch and a second auxiliary switch connected in series to each other via the second magnetic component.

* * * * *

UNITED STATES PATENT AND TRADEMARK OFFICE
CERTIFICATE OF CORRECTION

PATENT NO. : 9,979,271 B2  
APPLICATION NO. : 15/434453  
DATED : May 22, 2018  
INVENTOR(S) : Masaya Takahashi et al.

Page 1 of 1

It is certified that error appears in the above-identified patent and that said Letters Patent is hereby corrected as shown below:

On the Title Page

Item (73), Line 3, change "UNIVERTY" to --UNIVERSITY--.

Signed and Sealed this  
Tenth Day of July, 2018

Andrei Iancu  
*Director of the United States Patent and Trademark Office*